(12) United States Patent
Honkura et al.

(10) Patent No.: US 7,812,484 B2
(45) Date of Patent: Oct. 12, 2010

(54) PERMANENT MAGNET FOR MOTOR, MOTOR HOUSING, AND MOTOR DEVICE

(75) Inventors: Yoshinobu Honkura, Aichi-ken (JP); Hiroshi Matsuoka, Aichi-ken (JP); Atsushi Kano, Aichi-ken (JP); Kenji Noguchi, Aichi-ken (JP); Hironari Mitarai, Aichi-ken (JP); Satoru Kan, Aichi-ken (JP)

(73) Assignee: Aichi Steel Corporation, Aichi-ken (JP)

( * ) Notice: Subject to any disclaimer, the term of this patent is extended or adjusted under 35 U.S.C. 154(b) by 624 days.

(21) Appl. No.: 11/791,727

(22) PCT Filed: Nov. 29, 2005

(86) PCT No.: PCT/JP2005/021891

§ 371 (c)(1),
(2), (4) Date: Jul. 30, 2007

(87) PCT Pub. No.: WO2006/059603

PCT Pub. Date: Jun. 8, 2006

(65) Prior Publication Data

US 2008/0124235 A1  May 29, 2008

(30) Foreign Application Priority Data

Nov. 30, 2004 (JP) ............................. 2004-347171

(51) Int. Cl.
   *H02K 1/04* (2006.01)
(52) U.S. Cl. ............... 310/44; 310/156.28; 310/156.43; 310/43
(58) Field of Classification Search ............ 310/154.28, 310/43, 44, 156.43, 89, 156.28
See application file for complete search history.

(56) References Cited

U.S. PATENT DOCUMENTS 5,302,464 A * 4/1994 Nomura et al. ............. 428/551

(Continued)

FOREIGN PATENT DOCUMENTS

JP   60-63901   4/1985

(Continued)

OTHER PUBLICATIONS

Japanese Office Action dated Jul. 25, 2007 (with partial English translation).

(Continued)

*Primary Examiner*—Quyen Leung
*Assistant Examiner*—Leda Pham
(74) *Attorney, Agent, or Firm*—McGinn Intellectual Property Law Group, PLLC

(57) ABSTRACT

To improve resistance of a motor device against an organic solvent and to suppress degradation in performance of the motor device with time.

In a motor device, an excitation magnet is formed using a hollow-cylinder shaped anisotropic bonded magnet 13. This bonded magnet 13 is press-fitted in a housing 12 and is held. The bonded magnet 13 is formed of a hollow-cylinder shaped anisotropic rare earth bonded magnet which is obtained by compounding an anisotropic rare earth magnet powder with a phenol-novolac type epoxy resin, followed by molding. The anisotropic rare earth bonded magnet 13 is press-fitted along an inner peripheral portion of the housing 12, and on an exposed surface layer of the anisotropic rare earth bonded magnet press-fitted in the housing, a coating layer is formed by an infiltration treatment using a polyamide-imide-based resin.

26 Claims, 12 Drawing Sheets

(a)

(b)

U.S. PATENT DOCUMENTS 5,861,324 A * 1/1999 Ichinose et al. ............. 438/119
6,060,799 A * 5/2000 McManus et al. ............. 310/43

FOREIGN PATENT DOCUMENTS

| JP | 63-133610 | 6/1988 |
|---|---|---|
| JP | 4-273413 | 9/1992 |
| JP | 5-182850 | 7/1993 |
| JP | 8-22910 | 1/1996 |
| JP | 8-126264 | 5/1996 |
| JP | 10-22153 | 1/1998 |
| JP | 11-186027 | 7/1999 |
| JP | 2001-76917 | 3/2001 |
| JP | 2001-210505 | 8/2001 |
| JP | 2002-33209 | 1/2002 |
| JP | 2002-270415 | 9/2002 |
| JP | 2004-39822 | 2/2004 |
| JP | 2004-124122 | 4/2004 |
| WO | WO 03/085684 A1 | 10/2003 |

OTHER PUBLICATIONS

Form PCT/ISA/210.
Form PCT/ISA/237.
European Search Report dated Nov. 20, 2009.

* cited by examiner

[Fig. 1]
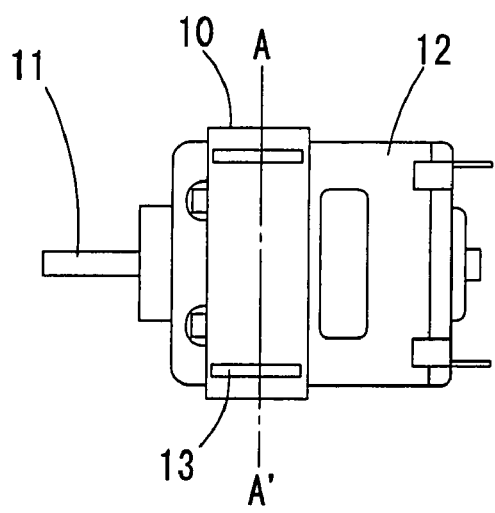
(a)
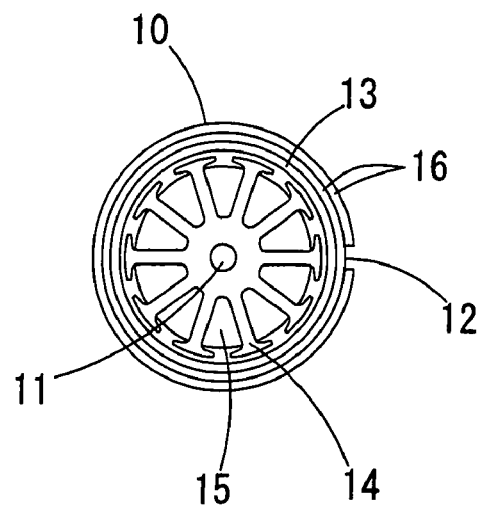
(b)

[Fig.2]
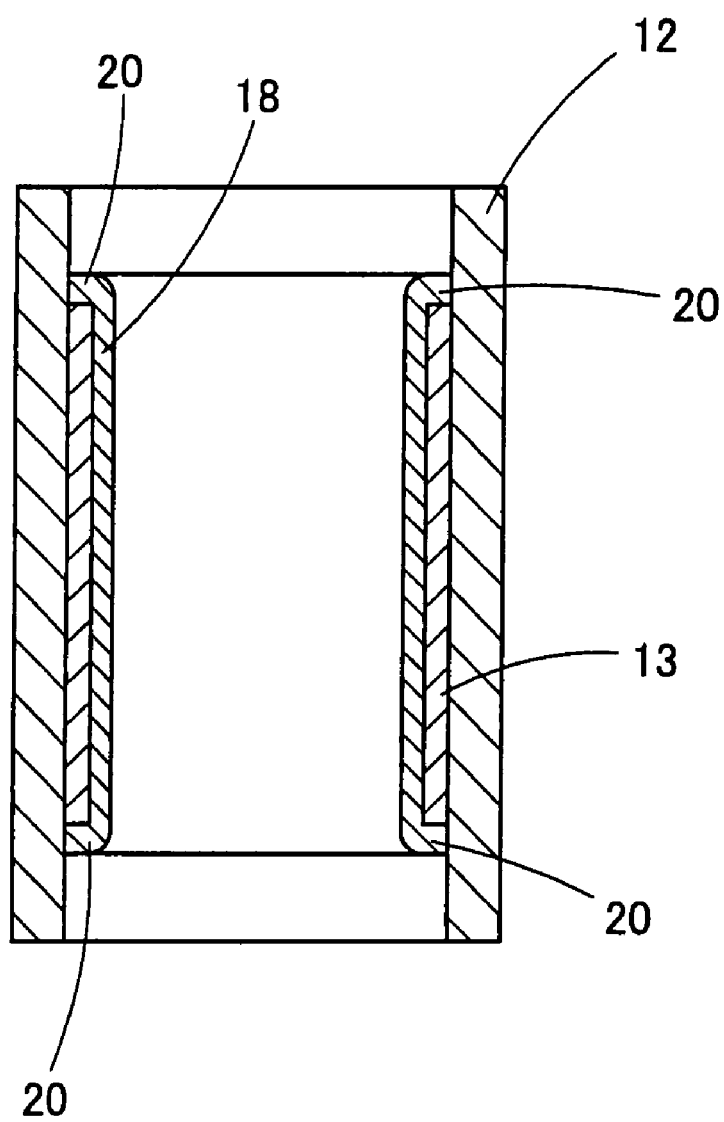

[Fig. 3]
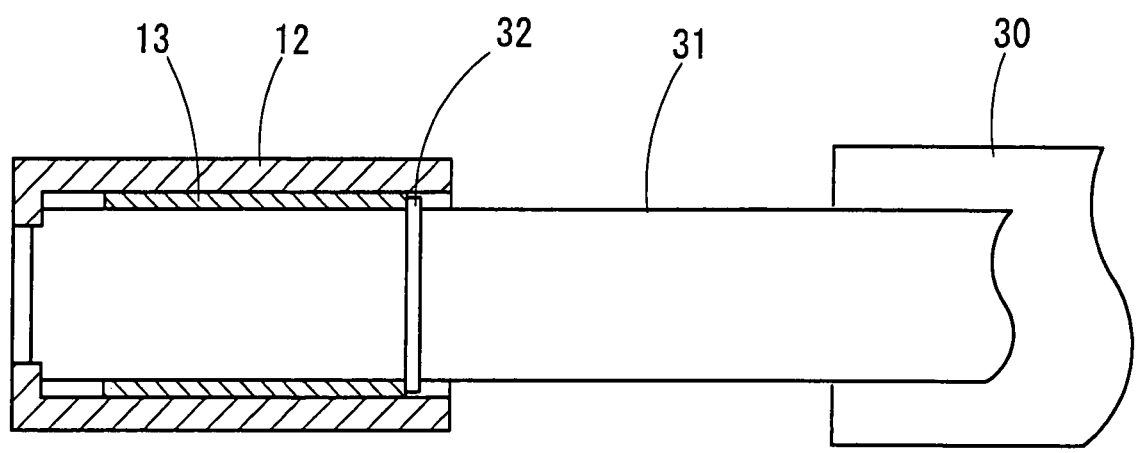

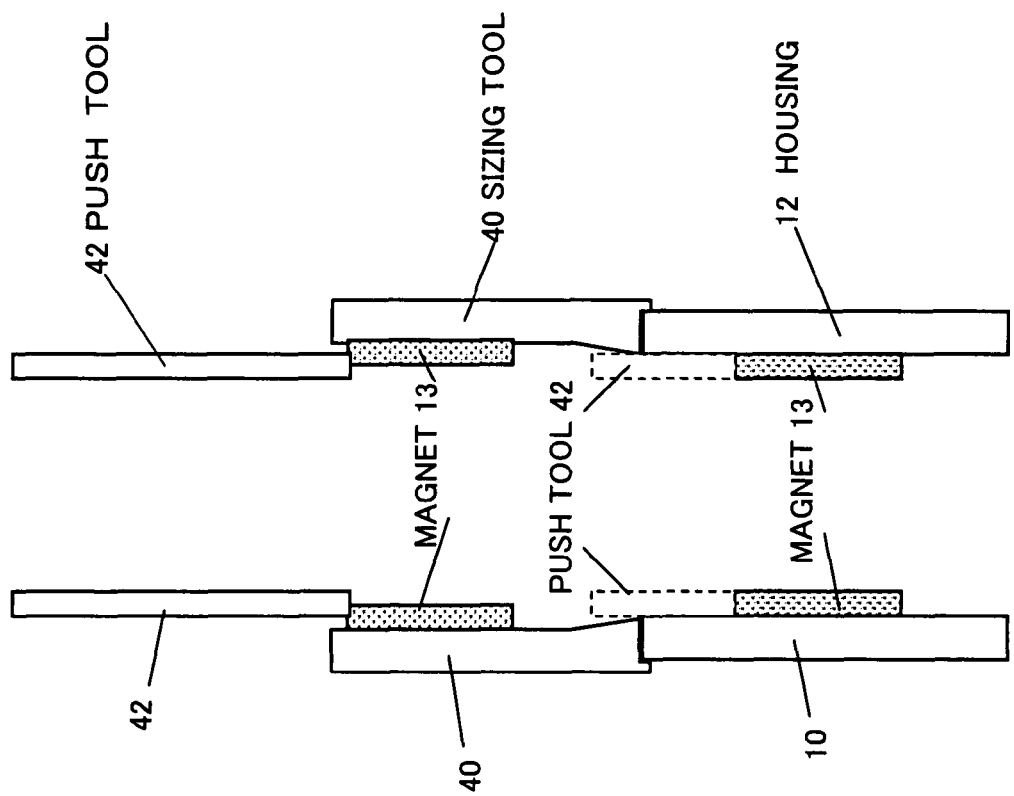
[Fig. 4]

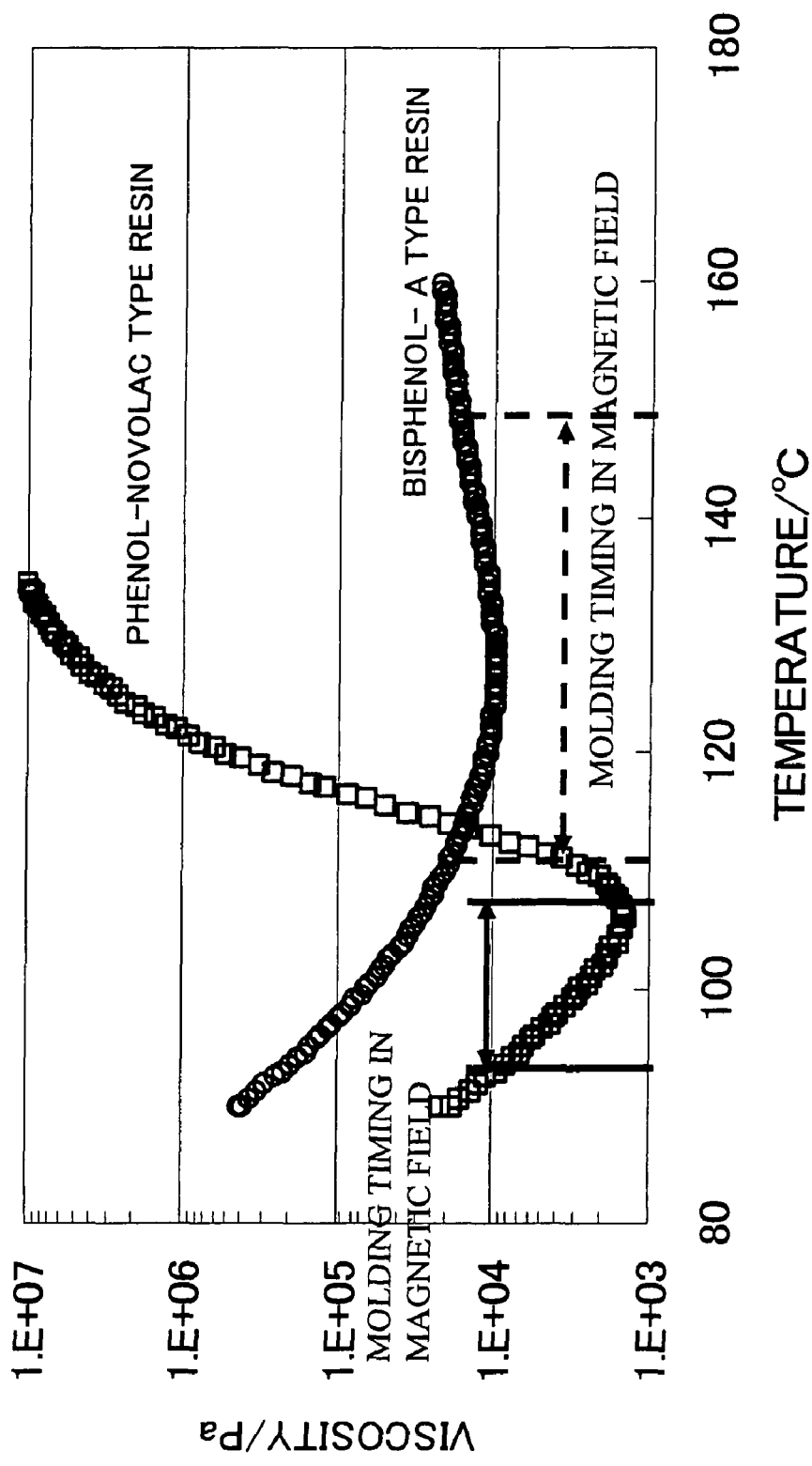
[Fig. 5]

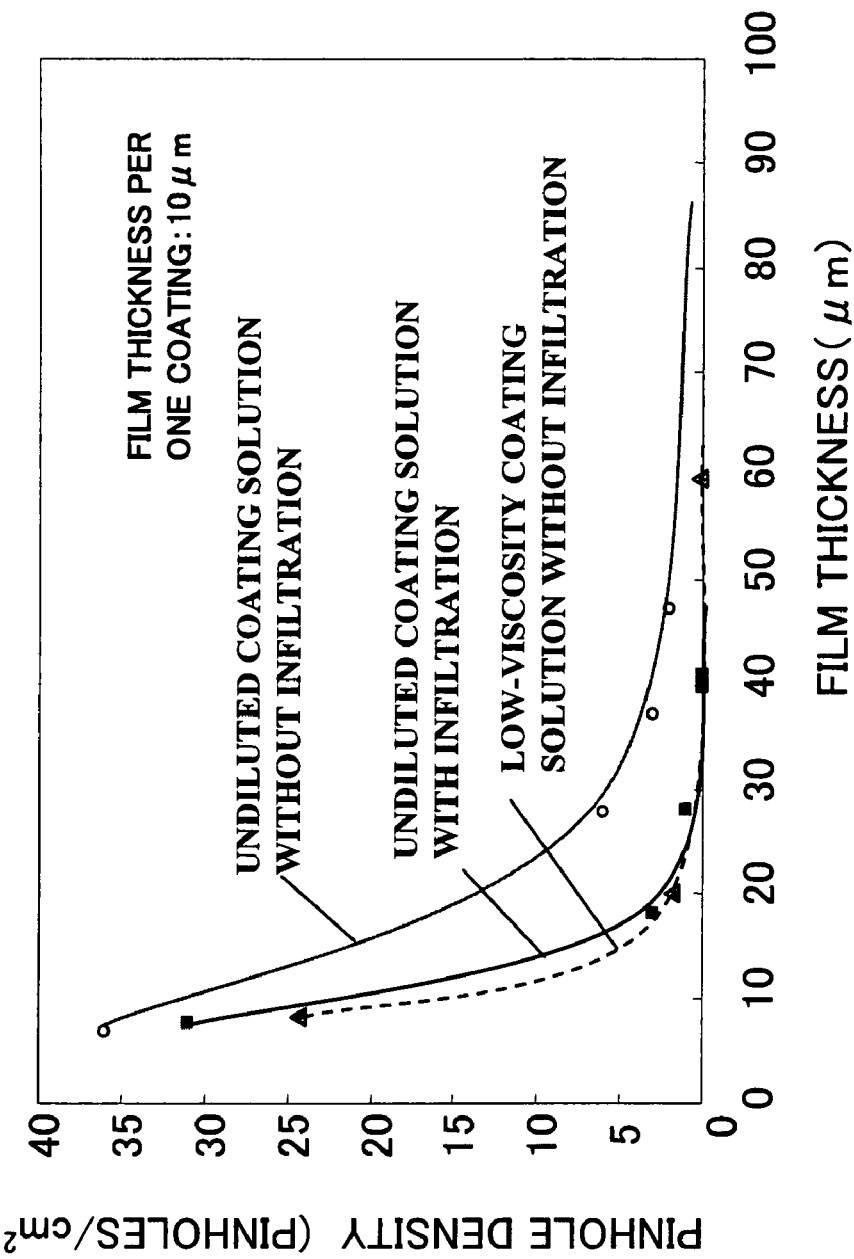
[Fig. 6]

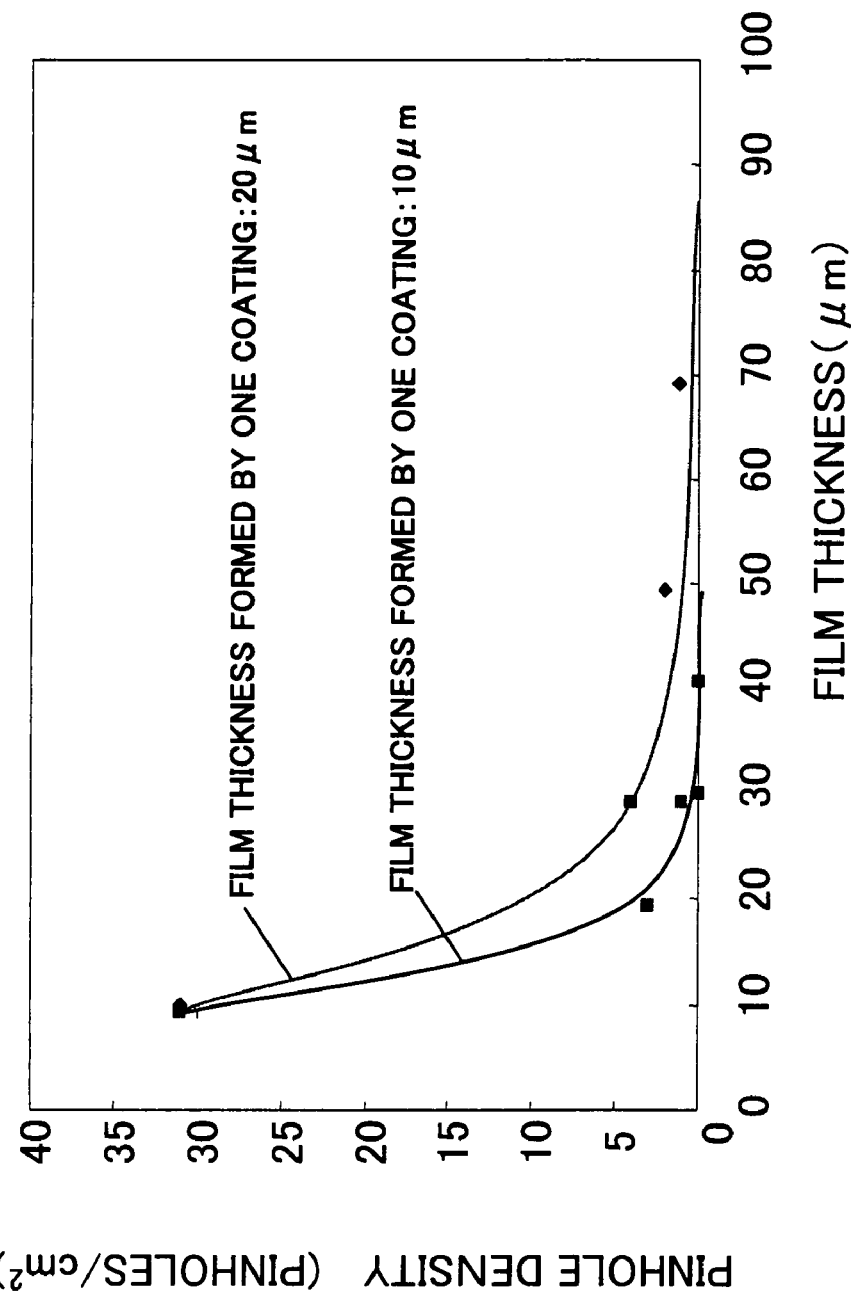
[Fig. 7]

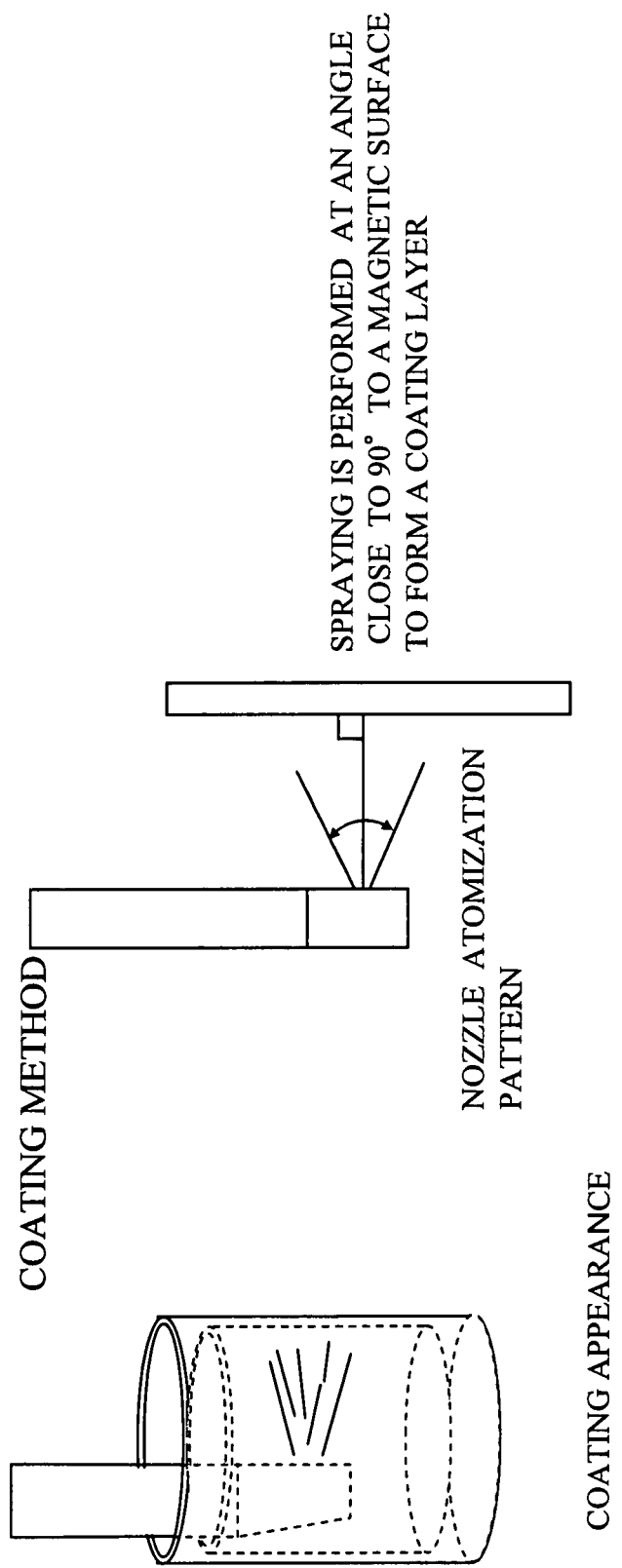

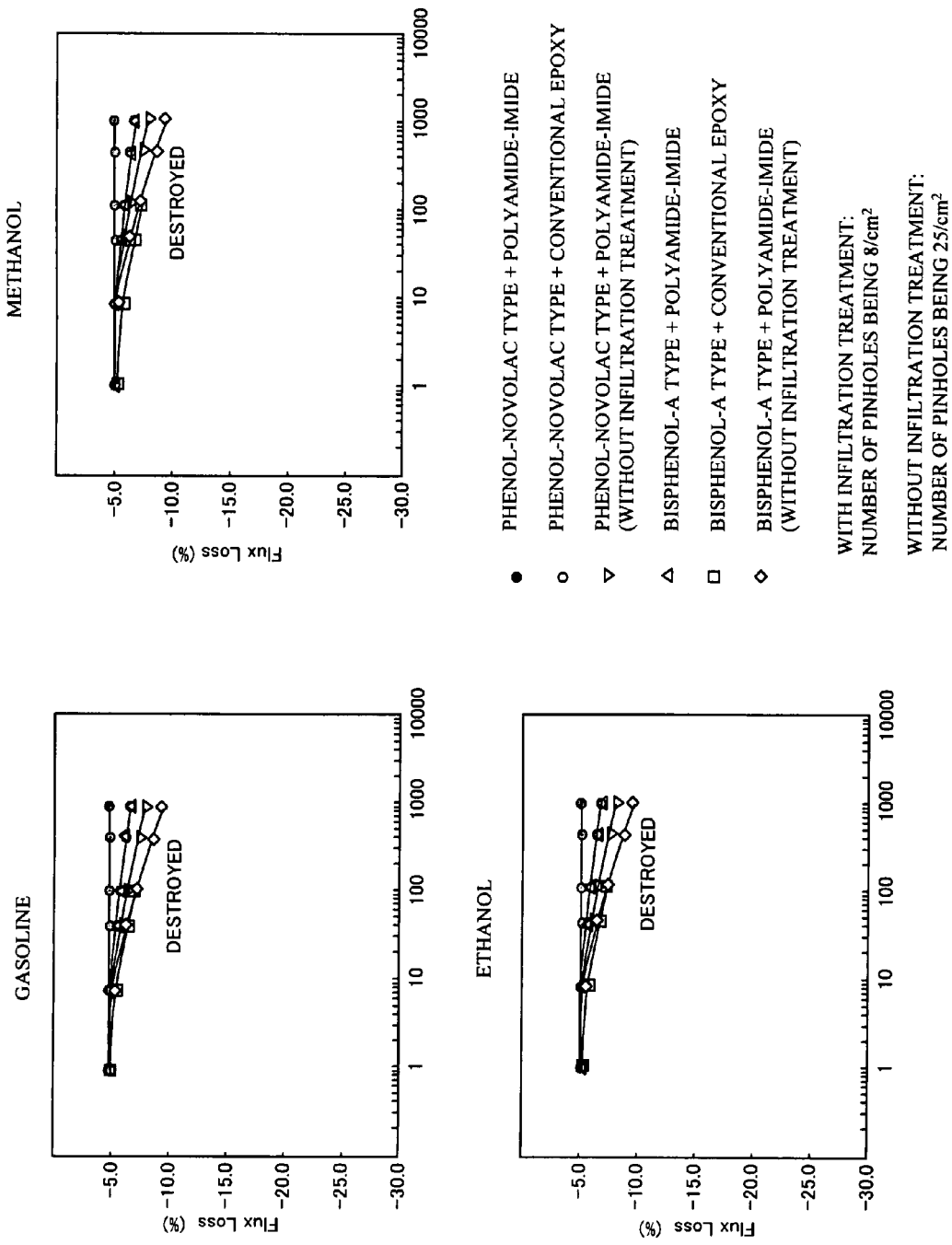

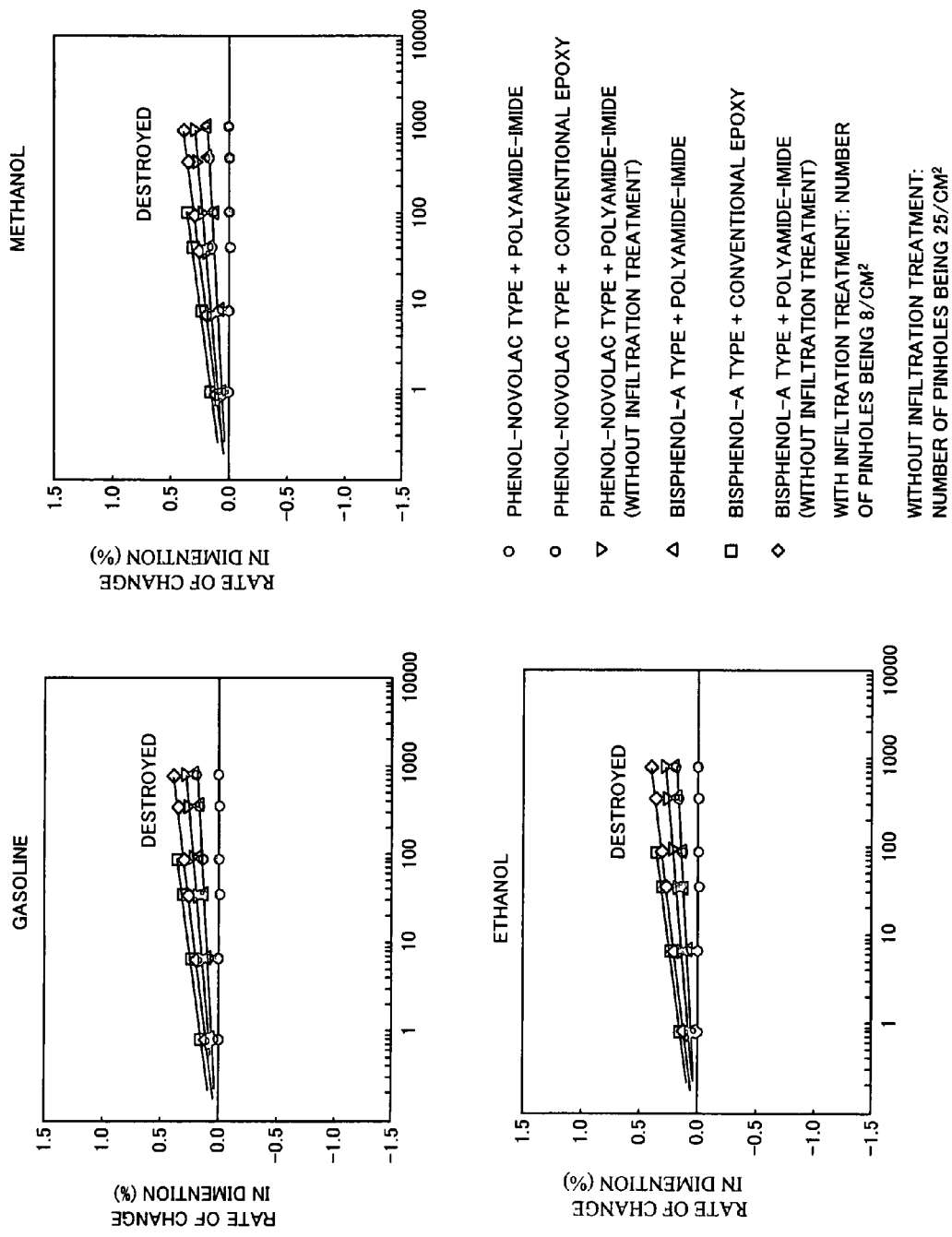

[Fig. 11]
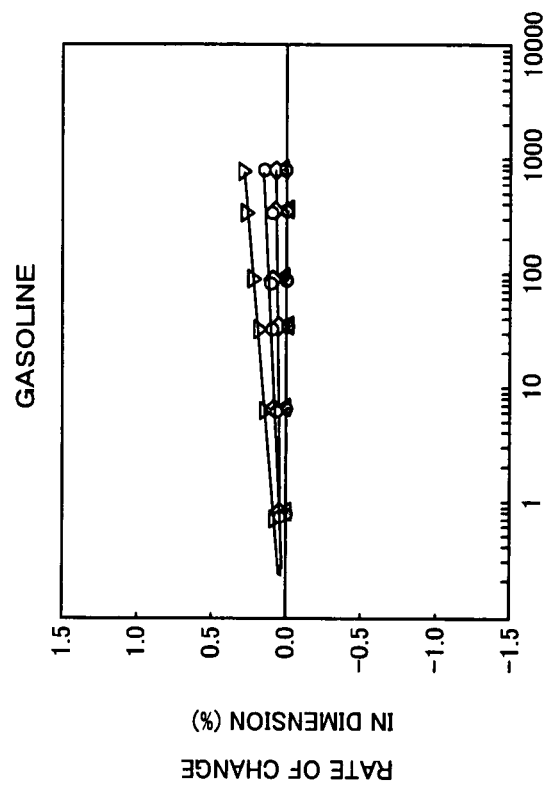
[Fig. 12]
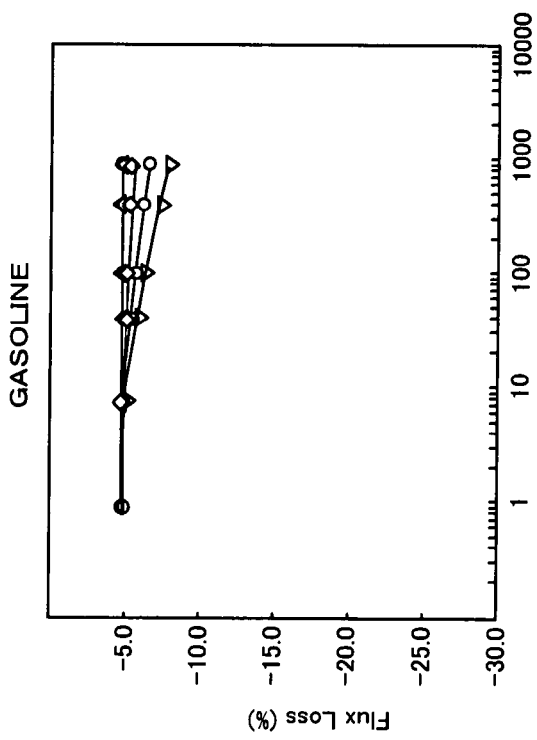

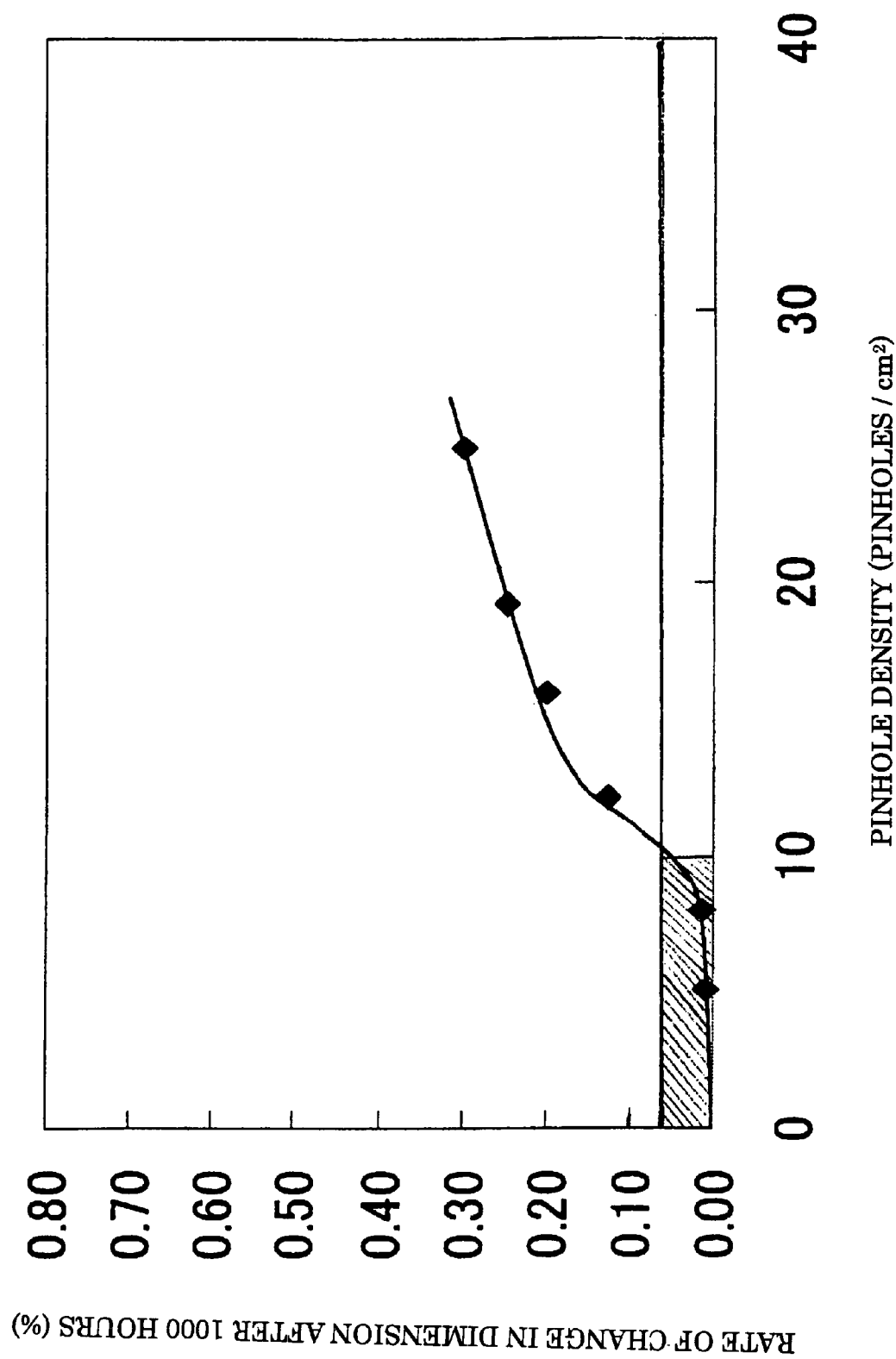
[Fig. 13]

PERMANENT MAGNET FOR MOTOR, MOTOR HOUSING, AND MOTOR DEVICE

TECHNICAL FIELD

The present invention relates to a permanent magnet for motor, a motor housing having a permanent magnet, and a motor device. In more particular, the present invention relates to a motor housing which uses an anisotropic rare earth bonded magnet as a permanent magnet, can reduce the size of a motor device and realize a higher torque output, has heat resistance, and can be used in an environment, such as in an organic solvent (in a liquid and a gas phase), and relates to a motor device. For example, the motor housing and the motor device are effectively applied to a fuel pump which is used while it is immersed in petroleum, such as light oil or gasoline for automobiles.

BACKGROUND ART

In recent years, in the field of motors, anisotropic rare earth bonded magnets have started to be used, and the motor performance has been significantly improved. However, needs for higher performance and reduction in size have been strong, and further improvement in motor performance has been required.

In the fields of automobiles and the like, motors are used at a high temperature in many cases, and hence heat resistance thereof is required. In addition, when used in an organic solvent such as gasoline, motors are also required to have corrosion resistance in that solvent.

An anisotropic rare earth bonded magnet used for motors for automobiles and the like, which are used in an organic solvent, has been required to simultaneously satisfy high motor properties, heat resistance, and corrosion resistance in an organic solvent.

Heretofore, a magnet which has been used is a sintered ferrite magnet having corrosion resistance. However, because of needs for improvement in motor performance, the use of the anisotropic rare earth bonded magnet has been studied.

As a conventional anisotropic rare earth bonded magnet which is used at room temperature and in the atmosphere, a magnet is used which is formed by compounding an anisotropic rare earth powder and a bisphenol-A type epoxy resin, followed by molding. Subsequently, this anisotropic rare earth bonded magnet is entirely coated for corrosion resistance and is adhered to a motor housing for the use.

Hence, since the coating and the adhesion layer are present between the motor housing and the anisotropic rare earth bonded magnet, which form a magnetic circuit, an air gap on the magnetic circuit is generated, and as a result, as motor properties using this magnet, the potential ability of the anisotropic rare earth bonded magnet could not be sufficiently extracted.

Furthermore, since a bisphenol-A type epoxy resin is inferior in heat resistance, it is difficult to use the above bonded magnet for automobile application that requires heat resistance.

In addition, a common bisphenol-A type epoxy resin is coated with an epoxy resin which is the same type as the above resin; however, in this case, the corrosion resistance in an organic solvent is inferior.

DISCLOSURE OF INVENTION

Problems to be Solved by the Invention

Accordingly, the anisotropic rare earth bonded magnet used heretofore has not satisfied any of properties including high motor properties, heat resistance, and corrosion resistance in an organic solvent.

The basic concept of the present invention is to eliminate the air gap for improving the motor properties by the steps of performing press-fitting of an anisotropic rare earth bonded magnet in a motor housing, and coating a surface of the rare earth bonded magnet, which is not press-fitted, for corrosion resistance, so that a more sufficient seal structure can be obtained.

In addition, in order to obtain heat resistance, instead of a conventional bisphenol-A type epoxy resin, a phenol-novolac type epoxy resin was used. However, although a phenol-novolac type epoxy resin is superior in heat resistance, compared to a commonly used bisphenol-A type epoxy resin, a transformable region at room temperature is small, and hence the press-fitting could not be easily performed.

In the present invention, by performing thermal press-fitting using properties in which the transformable region is increased at a temperature not more than the glass transition temperature of a phenol-novolac type epoxy resin, this resin could be first successfully applied to an anisotropic rare earth bonded magnet.

As for the corrosion resistance in an organic solvent, the following techniques may be mentioned.

First, it has been known that a resin, such as a polyimide resin or a polyamide-imide resin, has superior corrosion resistance by itself in an organic solvent.

As a technique using this resin for an anisotropic bonded magnet, for example, as disclosed in Japanese Unexamined Patent Application Publication No. 2004-124122, a technique has been known which improves the corrosion resistance of a ring-shaped rare earth bonded magnet used in a motor device for a fuel pump which is immersed in gasoline, an automobile fuel, that is, one type of an organic solution. According to this technique, the corrosion resistance and swelling resistance are improved by the steps of compounding a NdFeB-based magnetic powder and an epoxy resin used as a binder, molding the compound, and then coating a surface of the ring-shaped rare earth bonded magnet which is cured at 150° C. for 1 hour with a polyimide resin or a polyamide-imide resin having a glass transition temperature of 200° C. or more. The coating method of the above resin is a spray coating method which is performed in an oblique direction. In addition, the appearance inspection of the resin coating layer was performed using only a magnifying lens at a magnification of four times. Although a polyimide resin or a polyamide-imide resin is used which has superior corrosion resistance, even by approximately one cycle of 80° C. for 2 hours, the change in dimension is immediately observed, and hence it is believed that the properties of a polyimide resin or a polyamide-imide resin cannot be fully utilized.

In addition, according to Japanese Unexamined Patent Application Publication No. 2001-210505, it has been known that in order to improve corrosion resistance, a polyimide or a polyamide-imide film containing solid lubricant particles is formed to have a thickness of 5 to 30 µm by a spray tumbler method on a surface of a rare earth bonded magnet formed by molding a rare earth magnet powder together with at least one type resin used as a binder which is selected from the group consisting of an epoxy, a phenol, and a polyester resin. This coating method is also basically a spray coating method performed in an oblique direction. In addition, this invention is invention relating to a coating layer for anti-rusting, and the corrosion resistance against an organic solvent has not been disclosed at all.

The inventors of the present invention found that when a coating layer formed from a polyamide-imide resin by a spray coating method performed in a common oblique direction was simply observed at a magnification of 100 times, many pinholes were present. In addition, it was also found that an anisotropic rare earth bonded magnet, which is a base material, is attacked through these pinholes.

Accordingly, through intensive research on means for preventing the pinholes, improvement in corrosion resistance against an organic solvent (suppression of degradation in dimensional and magnetic properties with time) could be successfully achieved by prevent the pinholes as much as possible using an infiltration treatment.

As described above, according to the present invention, in an anisotropic rare earth bonded magnet which is used integral with a motor housing, a phenol-novolac type epoxy resin is used, the bonded magnet is press-fitted by heating in the motor housing, and a polyamide-imide-based resin coating layer formed by an infiltration treatment is provided on surfaces of the anisotropic rare earth bonded magnet which are not press-fitted; hence, high motor properties, heat resistance, corrosion resistance against an organic solvent can be simultaneously obtained for the first time.

Japanese Unexamined Patent Application Publication No. 2004-124122

Japanese Unexamined Patent Application Publication No. 2001-210505

The present invention has been conceived to solve the problems described above, and an object of the present invention is, even when an anisotropic rare earth bonded magnet is used in an organic solvent, to maintain high motor properties and to improve heat resistance and corrosion resistance.

Means for Solving the Problems

The structure of the present invention to achieve the above object is as follows. In accordance with the first feature of the present invention, there is provided a permanent magnet used for a motor, which is a hollow-cylinder shaped anisotropic rare earth bonded magnet and which includes an anisotropic rare earth magnet powder and a phenol-novolac type epoxy resin used as a binder. The anisotropic rare earth bonded magnet has on a surface thereof a coating layer comprising a polyamide-imide-based resin which has a thickness of 10 to 50 µm and a pinhole density of 10 pinholes/cm² or less.

In accordance with the second feature of the present invention, there is provided a motor housing including a housing of a motor and a permanent magnet disposed at an inner peripheral portion of the housing. The permanent magnet is a hollow-cylinder shaped anisotropic rare earth bonded magnet which is formed by compounding an anisotropic rare earth magnet powder with a phenol-novolac type epoxy resin, followed by molding. The anisotropic rare earth bonded magnet is heated and is press-fitted along the inner peripheral portion of the housing, and a coating layer comprising a polyamide-imide-based resin which has a thickness of 10 to 50 µm and a pinhole density of 10 pinholes/cm² or less is formed on an exposed surface layer of the anisotropic rare earth bonded magnet which is press-fitted in the housing.

In addition, in accordance with third feature of the present invention, there is provided a motor housing including a housing of a motor and a permanent magnet disposed at an inner peripheral portion of the housing. The permanent magnet is a hollow-cylinder shaped anisotropic rare earth bonded magnet which is formed by compounding an anisotropic rare earth magnet powder with a phenol-novolac type epoxy resin, followed by molding. The anisotropic rare earth bonded magnet is heated and is press-fitted along the inner peripheral portion of the housing, and an exposed surface layer of the anisotropic rare earth bonded magnet which is press-fitted in the housing is processed by at least an infiltration treatment using a polyamide-imide-based resin to form a coating layer.

The exposed surface layer of the anisotropic rare earth bonded magnet which is press-fitted in the housing is a portion which is not in contact with the housing (yoke), that is, the exposed surface layer includes the inner peripheral surface and the end surfaces of the hollow cylinder. In this case, the coating layer is continuously formed on the inner peripheral surface and the end surfaces of the anisotropic rare earth bonded magnet and may also be continuously formed on inner peripheral surfaces of the housing, which are located in the vicinities of the above end surfaces. As the infiltration treatment, as described later, for example, there may be mentioned a method in which solution particles of a polyamide-imide-based resin are sprayed on an inner peripheral surface of an anisotropic rare earth bonded magnet, and the bonded magnet is then placed under reduced-pressure conditions; a method in which an anisotropic rare earth bonded magnet is evacuated under a reduced-pressure environment, and a polyamide-imide-based resin solution is supplied under the reduced-pressure environment so that the bonded magnet is immersed in the solution; and a method in which an anisotropic rare earth bonded magnet is immersed in a polyamide-imide-based resin solution under reduced-pressure conditions. Furthermore, after the reduced-pressure infiltration or the immersion treatment is performed, it is more preferable when the infiltration is facilitated by pressurizing an ambient gas.

In addition, the infiltration treatment may be performed after the anisotropic rare earth bonded magnet is press-fitted in the housing or may be performed only for the anisotropic rare earth bonded magnet before it is press-fitted in the housing. In the former case, although the coating layer of a polyamide-imide-based resin is also formed on the inner surface of the housing, it can be used as an alternative to zinc plating. In addition, when, after the inner peripheral surface of the housing is masked, the infiltration treatment is performed, and the mask is then removed, the coating layer can be prevented from being formed on the inner peripheral surface of the housing. In addition, in the latter case, after a surface of the anisotropic rare earth bonded magnet which is to be in contact with the housing is masked, the infiltration treatment is performed, and subsequently, the anisotropic rare earth bonded magnet may be press-fitted in the housing after the mask is removed. Accordingly, the coating layer is prevented from being formed on the contact surface between the anisotropic rare earth bonded magnet and the housing, and as a result, the magnetic properties can be improved.

The anisotropic rare earth magnetic powder is characterized that superior magnetic properties can be obtained by an orientation treatment with heating, and various types of powders have been known as described below. In addition, any one of the powders may be used.

In accordance with fourth feature of the present invention, there is provided the motor housing according to the second or third feature of the invention, in which the anisotropic rare earth magnet powder includes an NdFeB-based magnetic powder processed by a d-HDDR treatment. When the NdFeB-based magnetic powder is used, magnetic properties of the bonded magnet can be significantly improved.

In accordance with the fifth feature of the present invention, there is provided the motor housing according to the fourth feature, in which the anisotropic rare earth magnet powder further includes an SmFeN-based magnetic powder. Since the SmFeN-based magnetic powder is further included, in the bonded magnet, more superior magnetic properties can be obtained.

In accordance with the sixth feature of the present invention, there is provided the motor housing according to one of the third to fifth feature, in which the infiltration treatment of the surface layer is to immerse the anisotropic rare earth bonded magnet in a solution of the polyamide-imide resin under reduced-pressure conditions. The anisotropic rare earth bonded magnet is immersed in the polyamide-imide-based resin solution, followed by evacuating a container receiving the solution. Accordingly, air bubbles present in the bonded magnet are removed into the solution, and the polyamide-imide is filled in the bonded magnet instead of the air bubbles.

In accordance with the seventh feature of the present invention, there is provided the motor housing according to the sixth feature, in which, before the anisotropic rare earth bonded magnet is immersed in the polyamide-imide-based resin solution under reduced-pressure conditions, the anisotropic rare earth bonded magnet is placed under a reduced-pressure environment to be evacuated, followed by supply of the solution under the reduced-pressure environment, so that the anisotropic rare earth bonded magnet is immersed in the solution. Since the anisotropic rare earth bonded magnet is first placed under the reduced-pressure environment, air bubbles inside the bonded magnet are removed. Subsequently, since the polyamide-imide-based resin solution is supplied under the reduced-pressure environment, and the bonded magnet is then immersed in the solution, the polyamide-imide is filled in the bonded magnet.

In accordance with the eight feature of the present invention, there is provided the motor housing according to one of the third to fifth feature, in which the infiltration treatment of the surface layer is performed by spraying a solution of the polyamide-imide-based resin, followed by placing the anisotropic rare earth bonded magnet under a reduced-pressure environment. Since after the spray coating is performed, the bonded magnet is placed under the reduced-pressure environment, air bubbles are removed outside from the inside of a binder resin, and the polyamide-imide-based resin applied on the surface is infiltrated inside instead of the air bubbles.

In the case described above, the solution of the polyamide-imide-based resin may contain an additive (such as chromium oxide, or poly(ethylene terephthalate): PTFE) in some cases.

In accordance with the ninth feature of the present invention, there is provided the motor housing according to one of the third to fifth feature, in which the infiltration treatment of the surface layer is performed using a capillary phenomenon by spraying a low-viscosity solution of the polyamide-imide-based resin.

The coating layer is formed on the surface layer of the anisotropic rare earth bonded magnet by spray coating of the polyamide-imide-based resin. The spray coating can be performed using a spray gun. For the spray gun, for example, airless spray, high-pressure air spray, low-pressure air spray, or pulse spray may be used. In addition, the spray coating is preferably performed while the bonded magnet is heated.

In accordance with the tenth feature of the present invention, there is provided the motor housing according to one of the third to ninth feature, in which the coating layer is formed by the infiltration treatment and subsequent spray coating of the polyamide-imide-based resin.

In accordance with the eleventh feature of the present invention, there is provided the motor housing according to one of the third to tenth feature, in which the coating layer is a layer formed by repeating coating and baking. The above coating and drying by the baking are repeatedly performed many times, so that the coating layer is formed. The coating layer is prevented from being penetrated to the surface thereof by pinholes which are formed when air bubbles present in the bonded magnet are removed or when a solvent of a polyamide-imide-based resin solution present in the bonded magnet is evaporated.

In accordance with the twelfth of the present invention, there is provided the motor housing according to one of the third to eleventh feature, in which the thickness of a coating layer is 10 to 50 μm. When this thickness is formed, the density of pinholes formed in the surface of the coating layer is significantly decreased.

In accordance with thirteenth feature of the present invention, there is provided the motor housing according to one of the second to twelfth feature, in which a pinhole density at the surface of a coating layer is 10 pinholes/cm$^2$ or less. When the pinhole density is not more that the above value, the change in dimension of the anisotropic rare earth bonded magnet caused by swelling is prevented, and as a result, degradation in magnetic properties caused by oxidation of a rare earth element can be prevented.

In accordance with the fourteenth feature of the present invention, there is provided a motor device including the motor housing according to one of the second to thirteenth feature.

In accordance with the fifteenth feature of the present invention, there is provided the motor device according to the fourteenth feature which is used in an organic solution.

In accordance with the sixteenth feature of the present invention, there is provided the motor device for a fuel pump, according to the fifteenth feature, wherein the motor device is used for a fuel pump of an automobile and is used in a state in which a petroleum fuel passes through the housing.

A motor device using the motor housing of the present invention can significantly prevent degradation in performance when it is used in an organic solution or in a state in which an organic solution passes through the housing. In particular, when the motor device is used as a motor device for fuel pump used in a state in which a fuel for automobile is transported in a housing, even in a bad environment in which the temperature considerably varies, the change in performance of the motor device with time can be suppressed, and hence, a superior effect can be obtained.

EFFECTS OF THE INVENTION

In the permanent magnet according to the first feature and in the motor housing having a permanent magnet, according to the second feature, the anisotropic rare earth bonded magnet used as the permanent magnet uses a phenol-novolac type epoxy resin as a binder and a polyamide-imide-based resin for a coating layer, and the structure is formed in which the thickness of the polyamide-imide coating layer is restricted in a specific range and in which the pinhole density is significantly decreased. That is, in particular, the thickness is set in the range of 10 to 50 μm, and the pinhole density is set to 10 pinholes/cm² or less; hence, common motor properties, heat resistance, and corrosion resistance in an organic solvent can be simultaneously obtained.

In addition, in the motor housing having a permanent magnet, according to the second feature, since the anisotropic rare earth bonded magnet is press-fitted in the housing without forming a coating layer on a contact surface in contact with the housing, the air gap between the above two is significantly decreased; hence, the magnetic resistance is decreased, and the motor performance is improved. Accordingly, high motor performance, heat resistance, and corrosion resistance in an organic solvent can be simultaneously obtained.

According to the third feature of the present invention, since the anisotropic rare earth bonded magnet used integral with the motor housing uses a phenol-novolac type epoxy resin and is press-fitted in the motor housing by heating, and the polyamide-imide-based resin coating layer formed by the infiltration treatment is provided on a surface at which the anisotropic rare earth bonded magnet and the housing is not in contact with each other, high motor properties, heat resistance, and corrosion resistance in an organic solvent can be simultaneously achieved. In this case, the infiltration treatment is a treatment in which the polyamide-imide-based resin is infiltrated in irregularities present on the surface of the anisotropic rare earth bonded magnet by using the difference between an ambient pressure and a pressure in concaves of the magnet or by using a capillary phenomenon of a resin solution.

When the anisotropic rare earth magnetic powder is used as described in the fourth and fifth feature, the magnetic properties of the bonded magnet can be significantly improved.

In accordance with the sixth feature, since the infiltration treatment of the surface layer is to immerse the anisotropic rare earth bonded magnet in a solution of the polyamide-imide-based resin under reduced-pressure conditions, air bubbles are released from the inside of the resin into the solution, and instead of the air bubbles, the polyamide-imide-based resin is infiltrated inside the resin. As a result, in addition to a further increase in the depth of the infiltration treatment, when the coating solution is applied to the magnet surface, air contained in irregularities of the magnet surface is removed, and hence formation of pinholes, caused by air which is expanded in heating and drying and is then blown out, can be prevented. In addition, since the coating layer formed by the infiltration treatment is smooth compared to the magnetic surface or a coating layer surface which is not processed by the infiltration treatment, the probability of pinhole formation in a coating layer formed on an upper layer of the formed coating layer can be remarkably decreased. As a result, corrosion resistance and swelling resistance of the bonded magnet can be improved.

According to the seventh feature of the present invention, before the anisotropic rare earth bonded magnet is immersed in the polyamide-imide-based resin solution under reduced-pressure conditions, it is placed under a reduced-pressure environment to be evacuated, and the above solution is then supplied under the reduced-pressure environment, so that the anisotropic rare earth bonded magnet is immersed in the solution. Accordingly, air bubbles are released from the inside of the bonded magnet into the solution, and instead of the air bubbles, the polyamide-imide-based resin is infiltrated in the bonded magnet. As a result, the depth of the infiltration treatment is further increased, and the reliability thereof is ensured; hence, corrosion resistance and swelling resistance of the bonded magnet can be improved.

According to the eighth feature of the present invention, the infiltration treatment of the surface layer is performed by spraying a solution of the polyamide-imide-based resin, followed by placing the anisotropic rare earth bonded magnet under a reduced-pressure environment. Hence, air bubbles are released from the inside of the bonded magnet to the outside, and instead of the air bubbles, the polyamide-imide-based resin applied on the surface is infiltrated inside. Hence, corrosion resistance and swelling resistance of the bonded magnet can be improved.

Accordingly, since the formation of the coating layer to be subsequently performed can be continuously performed by the same method as described above, the formation of the motor housing can be easily performed. In this case, in the spraying treatment, the infiltration treatment and the formation of the coating layer cannot be clearly discriminated from each other.

According to the ninth feature of the present invention, the infiltration treatment of the surface layer is performed using a capillary phenomenon by spraying a low-viscosity solution of the polyamide-imide-based resin. Hence, the polyamide-imide resin can be uniformly and evenly infiltrated inside the bonded magnet.

According to the tenth feature of the present invention, since the coating layer is formed by the infiltration treatment, followed by spray coating of the polyamide-imide-based resin, a more reliable coating layer can be formed on an exposed surface of the bonded magnet, and as a result, corrosion resistance and swelling resistance of the bonded magnet can be improved.

According to the eleventh feature of the present invention, the coating layer is a layer formed by repeating coating and baking. Hence, pathways of air bubbles released from the inside of the bonded magnet to the outside are once blocked by a coating layer formed thereon. As a result, the number of pathways communicating from the inside of the bonded magnet to the exterior surface of the coating layer is significantly decreased. As a result, corrosion resistance and swelling resistance of the bonded magnet can be significantly improved.

In addition, according to the twelfth feature of the present invention, when the thickness of the coating layer is set to 10 to 50 μm, the density of pinhole formed in the surface of the coating layer is significantly decreased, and hence corrosion resistance and swelling resistance of the bonded magnet can be significantly improved.

According to the thirteenth feature of the present invention, since the pinhole density at the surface of the coating layer is set to 10 pinholes/cm² or less, corrosion resistance and swelling resistance of the bonded magnet can be significantly improved as described above.

In addition, according to the fourteenth, fifteenth, and sixteenth feature of the present invention, even when being used in an organic solvent or being used in a state in which an organic solvent is transported inside the housing, a motor device having very small degradation in performance with time can be obtained.

BRIEF DESCRIPTION OF THE DRAWINGS

FIG. 1 includes structural views of a DC brush motor device according to one particular embodiment of the present invention.

FIG. 2 is a cross-sectional view along a shaft direction showing the state in which an anisotropic rare earth bonded magnet of a DC brush motor of an embodiment is press-fitted in an inner peripheral portion of a housing.

FIG. 3 is a structural view of a mechanism for press-fitting an anisotropic rare earth bonded magnet of a DC brush motor of an embodiment in an inner peripheral portion of a housing.

FIG. 4 is a structural view of another mechanism for press-fitting an anisotropic rare earth bonded magnet in an inner peripheral portion of a housing.

FIG. 5 is a view showing measured viscosity properties of a phenol-novolac type epoxy resin and a bisphenol-A type epoxy resin with respect to the temperature.

FIG. 6 is a view showing a measured relationship between the thickness of a coating layer and a pinhole density.

FIG. 7 is a view showing a measured relationship between the thickness of an entire coating layer and a pinhole density, which is obtained when a coating thickness of the coating layer per coating is changed.

FIG. 8 includes views illustrating a method for forming a coating layer.

FIG. 9 includes views showing measured relationships between magnetic properties and an immersion time for immersing an anisotropic rare earth bonded magnet in various organic solutions, which are obtained from an example and comparative examples 1 to 3.

FIG. 10 includes views showing measured relationships between the rate of change in dimension (swelling properties) and an immersion time for immersing an anisotropic rare earth bonded magnet in various organic solutions, which are obtained from an example and comparative examples 1 to 3.

FIG. 11 is a view showing a measured relationship between magnetic properties and an immersion time for immersing an anisotropic rare earth bonded magnet in gasoline, which is represented by a pinhole density as a parameter.

FIG. 12 is a view showing a measured relationship between the rate of change in dimension and an immersion time for immersing an anisotropic rare earth bonded magnet in gasoline, which is represented by a pinhole density as a parameter.

FIG. 13 is a view showing a measured relationship between the rate of change in dimension and a pinhole density, which is obtained when an anisotropic rare earth bonded magnet is immersed in gasoline for 1,000 hours.

REFERENCE NUMERALS 10 back yoke
11 rotary shaft
12 housing
13 anisotropic rare earth bonded magnet
14 armature
15 coil
16 motor housing
18 coating layer
30 cylinder
31 piston
32 convex ring
40 sizing tool
42 push tool

BEST MODE FOR CARRYING OUT THE INVENTION

Hereinafter, the present invention will be described with reference to embodiments. However, the present invention is not limited to the following embodiments.

First Embodiment

FIGS. 1(a) and 1(b) show one example of a motor device of this embodiment. FIG. 1 includes a side view (a) and a cross-sectional view (b) taken along a line A-A'. The motor device of this embodiment is formed to reduce the size of a conventional motor device, to realize a higher torque constant, and to prevent degradation in motor properties with time when it is used in an organic solvent. The motor device of this embodiment is composed of a housing 12, a hollow-cylinder shaped anisotropic rare earth bonded magnet 13, which is a permanent magnet, provided in an inner peripheral portion of the housing 12, an armature 14 provided at a central portion to form an electromagnetic rotor, coils 15 coiled around the armature 14, a rotary shaft 11 extending from a center portion of the armature 14, and a back yoke 10 provided for prevention of magnetic flux leakage. In this embodiment, an anisotropic rare earth bonded magnet is used as the bonded magnet 13. In the case in which an anisotropic rare earth bonded magnet having a maximum energy product of 14 MGOe (111 KJ/m$^3$) or more is used, since the maximum energy product is large, when the anisotropic rare earth bonded magnet 13 is press-fitted in the back housing 12, improvement in motor performance is significant because of a reduction effect of reducing the magnetic resistance of a magnetic circuit. The anisotropic rare earth bonded magnet 13 is magnetized with four poles, and the number of slots of the armature in which the coils are provided is 10. In this specification, the term of a motor housing 16 is used as a concept including the housing 12 and the back yoke 10. The back yoke 10 is not always necessary, and only the housing 12 may form the motor housing.

By the way, the above anisotropic rare earth bonded magnet 13 has finally become mass-producible in recent years by the assignee of the present invention. For example, this anisotropic rare earth bonded magnet 13 can be produced by the methods disclosed in Japanese Unexamined Patent Application Publication No. 2001-76917, Japanese Patent Nos. 2816668 and 3060104, and International Patent Application PCT/JP03/04532. This anisotropic rare earth bonded magnet can be currently produced to have a maximum energy product of 17-28 MGOe (135-223 KJ/m$^3$).

The motor device of this embodiment (shown in FIGS. 1(a) and 1(b)) uses the anisotropic rare earth bonded magnet 13 which has a hollow-cylinder shape and which is composed of NdFeB. In addition, magnetization is performed with four poles to remarkably decrease the magnetic path length of the magnetic circuit per pole, so that it is intended to increase a torque applied to the armature 14. The anisotropic rare earth bonded magnet 13 is manufactured by compounding a resin and a magnetic powder composed of NdFeB, followed by molding, and is strongly magnetized in a diameter direction. As a material for the anisotropic rare earth bonded magnet, besides NdFeB, an NdFeB-based material, such as a material containing Nd and a rare earth element other than Nd or another additional element, may also be used. Furthermore, a material containing a rare earth element other than Nd, such as an SmFeN-based material or an SmCo-based material, and a mixed material containing the above material and an NdFeB-based material may also be used.

In particular, as the anisotropic rare earth bonded magnet 13, a composite rare earth anisotropic bonded magnet is preferably used which is composed of 50 to 84 mass percent (mass %) of an R1FeB-based coarse powder (R1 will be described later), which is formed of an R1FeB-based anisotropic magnet powder having an average particle diameter of 50 to 400 μm and a first surfactant covering the surfaces of constituent particles of the above R1FeB-based anisotropic magnet powder, this magnet powder being obtained by performing a hydrogen treatment (d-HDDR) for an R1FeB-based alloy primarily composed of a rare earth element (this element is abbreviated as "R1") including yttrium (Y), iron (Fe), and boron (B); 15 to 40 mass % of an R2Fe(N,B)-based fine powder (R2 will be described later), which is formed of an R2Fe(N,B)-based anisotropic magnet powder primarily composed of a rare earth element (this element is abbreviated as "R2") including Y, Fe, and nitrogen (N) or B and having an average particle diameter of 1 to 10 μm and a second surfactant covering the surfaces of constituent particles of the above R2Fe(N,B)-based anisotropic magnet powder; and 1 to 10 mass % of a phenol-novolac type epoxy resin functioning as a binder. In addition, as the anisotropic rare earth bonded magnet 13, the above compound rare earth anisotropic bonded magnet preferably has a maximum magnetic energy product (BH)max of 21 to 28 MGOe (167 to 223 KJ/m$^3$) and a irreversible flux loss of 6% or less. Here, the decreasing rate of magnetic represents a decreasing rate of magnetic, which is equivalent to the increasing flux obtained by remagnetization, after it is held for 1,000 hours at 100° C. In addition, a method for manufacturing this composite rare earth anisotropic bonded magnet is disclosed in International Patent Application PCT/JP03/04532.

The heat resistance of a phenol-novolac type epoxy resin is significantly superior to that of a bisphenol-A type epoxy resin. When the glass transition temperatures of the above two types of resins are compared to each other, although the glass transition temperature of the phenol-novolac type epoxy resin is 180 to 220° C., the bisphenol-A type epoxy resin has a glass transition temperature of 80 to 120° C. The heat resistance of a motor caused by a resin means (common high-temperature strengths and) that a product composed of an anisotropic bonded magnet press-fitted in a motor housing functions as an elastic body in a glass-state region under a high-temperature environment and maintains an adhesion force by an elastic strain caused by the press-fitting. When the glass transition temperature is low, such as 80 to 120° C., as that of the bisphenol-A type epoxy resin, and when the temperature exceeds an approximate glass transition temperature (such as approximately 50° C.), the elastic deformation starts, and at approximately 80° C., a considerable elastic deformation occurs; hence, a stress generated by press-fitting is released, and as a result, the adhesion force cannot be maintained.

As one particular example of the R1FeB-based anisotropic magnet powder, an NdFeB-based anisotropic magnet powder may be mentioned, and as one particular example of the R2Fe(N,B)-based anisotropic magnet powder, an SmFeN-based anisotropic magnet powder may be mentioned. By using the composite rare earth anisotropic bonded magnet as described above, a high maximum energy product (BH)max of 21 to 28 MGOe (167 to 223 KJ/m$^3$) can be obtained. In addition, the above composite rare earth anisotropic bonded magnet can decrease the irreversible flux loss, which is the rate demagnetized by the change with time (corresponding to the rate of increase in magnetic flux obtained by remagnetization), to 6% or less, and heat resistance and weather resistances, such as oxidation resistance, can be improved. As a result, a motor using the composite rare earth anisotropic bonded magnet can obtain a higher effect of the present invention, and hence the reliability and the serviceable life can be improved.

In addition, the bonded magnet is also called a plastic magnet. This magnet is characterized in that the maximum energy product (BH)max is approximately 5 times or more that of a conventional sintered ferrite magnet. That is, although the maximum energy product (BH)max of a standard sintered ferrite magnet is 3.5 MGOe (28 KJ/m$^3$), this anisotropic rare earth bonded magnet has a maximum energy product of 17 MGOe (135 KJ/m$^3$) which is approximately 5 times that described above.

This anisotropic rare earth bonded magnet 13 is press-fitted in the housing 12. The weight ratio of the phenol-novolac type epoxy resin of the anisotropic rare earth bonded magnet 13 is set in the range of 2 to 3 percent by weight. An anisotropic magnetic powder is supplied into a die together with its binder resin, is then oriented by applying a magnetic field in a heated state, and is further processed by compression molding (hereinafter referred to as "heat molding in a magnetic field"). In addition, instead of this heat molding in a magnetic field, after a premolded body is formed by supplying an anisotropic magnetic powder and a binder resin in a die, followed by compression molding (hereinafter referred to as "light pressure compression molding"), heat molding in a magnetic field may be performed. In addition, after light pressure compression molding is performed to form a member forming a premolded body, and heat molding in a magnetic field is then further performed to form the premolded body, a high pressure compression molding may be performed by heating.

This molded body is processed by a curing treatment, so that a hardening degree of the resin is increased to 90% to 100%. Accordingly, binding between the magnetic powder and the resin and that between resin grains are increased. Next, as shown in FIGS. 3 and 4, this hollow-cylinder shaped molded body is inserted around a piston 31, which has a positioning convex ring 32, of a press-fitting cylinder 30, and the cured molded body of the anisotropic rare earth bonded magnet 13 is heated at the glass transition temperature or less. The position of the anisotropic rare earth bonded magnet (hereinafter simply referred to as "bonded magnet") 13 around the piston 31 is determined by the convex ring 32. By this heating at the glass transition temperature or less, that is, by heating the resin at the glass transition temperature or less, without breaking the bonding between the magnetic powder and the resin and that between the resin grains, the elongation rate can be increased, and hence a sufficient deformation corresponding to the amount of press-fitting can be obtained when the bonded magnet 13 is press-fitted in the housing 12. Accordingly, since a phenol-novolac type epoxy resin that could not be press-fitted in the past can be press-fitted, the air gap on the magnetic circuit of a motor that requires heat resistance can be decreased; hence, the motor performance can be improved, and in addition, the heat resistance can be imparted to the motor.

Under the conditions described above, the press-fitting cylinder 30 is driven, so that a front end of the piston 31 is brought into contact with a front portion of the housing as shown in FIG. 3. In addition, since the bonded magnet which is not totally cured is removed from the mold, it is deformed while transported to a subsequent step, and hence the perfect roundness is not always maintained. Subsequently, the bonded magnet is cured by the curing treatment. Accordingly, by heating at the glass transition temperature or less, since the elongation rate is increased, the bonded magnet is elastic deformed along the shape of the housing 12 when it is press-fitted in the housing 12, and hence the perfect roundness can be obtained. Under the conditions described above, the position of the bonded magnet 13 in the housing 12 is determined. By the operation of this piston 31, the anisotropic rare earth bonded magnet 13 is press-fitted along the inner peripheral portion of the housing 12 and is positioned at a predetermined position. After the bonded magnet 13 is left for a certain period of time so as to be cooled, the press-fitting cylinder 30 is driven to draw out the piston 31, so that the anisotropic rare earth bonded magnet 13 is fixed in the inner peripheral portion of the housing 12 by press-fitting.

When the weight ratio of the phenol-novolac type epoxy resin is more than 3 percent by weight, since the amount of the magnetic powder is decreased, the cooling rate after the bonded magnet 13 is inserted in the housing 12 is decreased, and hence when the piston 31 is drawn out, a stress is applied to the bonded magnet 13, so that the mechanical strength may be degraded in some cases. That is, in drawing out the piston 31, when cooling of the bonded magnet 13 is not sufficient, and the temperature is high, since the elastic deformability of the bonded magnet 13 is high, a tensile stress is applied thereto when the piston 31 is drawn out. As a result, the bonded magnet 13 is largely elastic deformed, and stress concentration is generated at a portion with which the rare earth magnetic powder present in the bonded magnet 13 is in contact; hence, the mechanical strength may be degraded in some cases. Accordingly, the temperature at which the piston 31 is drawn out from the bonded magnet 13 is preferably less than 40° C.

In addition, after the dimensional diameter and the roundness of the bonded magnet 13 are corrected by a device shown in FIG. 4, the bonded magnet 13 may be inserted in the housing 12. That is, while the shape of the bonded magnet 13 having a diameter larger than that of the housing 12 is being corrected by using a sizing tool 40 having a diameter larger than that of the housing 12, the bonded magnet 13 may be press-fitted in the housing 12 by using a push tool 42. In this case, while the shape of the bonded magnet 13 is being changed by heating at the glass transition temperature or less, the bonded magnet 13 is press-fitted in the housing 12.

In addition, when the weight ratio of the resin is less than 2 percent by weight, the bonding between the magnetic powder and the resin is decreased, and a stress may be applied to the bonded magnet 13 when it is press-fitted in the housing 12, so that the mechanical strength may be degraded in some cases.

When the glass transition temperature is represented by T° C., the upper limit of the temperature for press-fitting is T° C. or less, and the lower limit thereof is approximately (T−100)° C. T° C. of the phenol-novolac type epoxy resin used in this embodiment was 200° C., and the press-fitting was performed at a temperature in the range of 120 to 200° C. In this temperature range, the performance of the bonded magnet using this phenol-novolac type epoxy resin as the binder is not degraded, and since the resin is placed in a glass state region without breaking the bonding between the magnetic powder and the resin and that between the resin grains, the elongation rate can be increased; hence, the bonded magnet 13 is most preferably press-fitted in the housing 12.

FIG. 2 shows the state in which the anisotropic rare earth bonded magnet 13 is press-fitted in the housing 12. Under the state described above, a polyamide-imide resin is sprayed from the inside of the hollow-cylinder shaped bonded magnet 13 in a direction of 90° to the inner peripheral surface of the magnet so that the surface layer is processed by an infiltration treatment using a capillary phenomenon, and the spraying is further continued, thereby forming a coating layer 18. In this step, the coating layer 18 is also continuously formed on positions 20 of the inner peripheral surface of the housing 12 which are in the vicinities of the two end portions of the bonded magnet 13. Accordingly, since the anisotropic rare earth bonded magnet 13 processed by the infiltration treatment using the polyamide-imide resin is totally separated from the ambient air by the housing 12 and the coating layer 18, oxidation, corrosion, and swelling of the bonded magnet can be prevented. In addition, since the bonded magnet 13 and the inner peripheral surface of the housing 12 are physically adhered to each other, the air gap is not present therebetween, and hence the magnetic resistance of the magnetic circuit can be decreased. As a result, the ability of the anisotropic rare earth bonded magnet 13 having a large energy product can be sufficiently extracted, and a motor having a high output torque and motor performance index (torque constant/motor volume) can be obtained. In addition, by the coating layer 18 also continuously provided on the inner peripheral surface of the housing 12, the bonded magnet 13 can be reliably fixed to the housing 12.

The spraying in a direction of 90° C. is superior to spraying performed in an oblique direction in terms of a capillary phenomenon effect. However, after spraying in an oblique direction is performed, when an infiltration treatment such as evacuation is performed, an effect similar to that described above can be obtained.

As has thus been described, when the weight ratio of the resin of the anisotropic rare earth bonded magnet 13 is set in the range of 2 to 3 percent by weight, and after the compression molding and the curing treatment to obtain a hardening degree of 90% to 100% are performed, when the magnetic bonded 13 is placed in a glass state region by reheating at the glass transition temperature (approximately 200° C.) or less, the correction of the shape can be performed, and the bonded magnet 13 can be easily press-fitted in the inner peripheral portion of the housing 12.

In addition, the motor device as a particular example has the following features. Although the types of motor devices is not limited, it is effectively used in a DC brush motor having an output power of 300 W or less. The DC brush motor device has a permanent magnet disposed in an inner peripheral portion of a housing of the motor and an electromagnetic rotor disposed at a central portion, and the motor outer diameter is 50 mm or less. In this DC brush motor device, the permanent magnet is an anisotropic rare earth bonded magnet which is magnetized with at least four poles, has a thin hollow-cylinder shape, and has a maximum energy product of 17 MGOe or more, and when the thickness of the anisotropic rare earth bonded magnet in a diameter direction is represented by d, the thickness of the motor housing is represented by w, and the diameter of the electromagnetic rotator is represented by a, the ratio w/d of the housing thickness to the magnet thickness is larger than 1 and not larger than 3, and the ratio d/a of the thickness of the anisotropic rare earth bonded magnet in a diameter direction to the diameter of the electromagnetic rotator is not smaller than 0.015 and not larger than 0.07.

In addition, the motor housing described above is a concept including a back yoke, and a motor housing outer diameter r is used to indicate the outer diameter of the motor device including the back yoke. The following description will be performed in comparison with a commonly spread two-pole (ferrite) motor device.

The ratio w/d of the housing thickness to the magnet thickness is set in the range of large than 1 and not larger than 3 (i.e., $1<w/d\leq3$) by the following points. In the case of a DC brush motor using a sintered ferrite magnet, since the magnetic force of the magnet is weak, even when the housing thickness is small with respect to the magnet thickness, the magnetic leakage can be sufficiently prevented. However, on the other hand, in the case in which an anisotropic rare earth bonded magnet is used, when w/d is 1 or less, since the magnetic force is strong, the magnetic leakage cannot be prevented, and hence w/d must be larger than 1. When w/d is larger than 3, although the magnetic force is strong, since the housing thickness is excessively large, the magnetic leakage is prevented; however, since the housing thickness is unnecessarily increased, the size cannot be sufficiently reduced, and as a result, the motor performance index is decreased.

In addition, the ratio d/a of the magnet thickness to the diameter of the electromagnetic rotator is set in the range not smaller than 0.015 and not larger than 0.07, i.e., $0.015 \leq d/a \leq 0.07$, by the following point.

When the ratio is in the above range, a motor performance index T (T=torque constant/volume) becomes two times or more the motor performance index T (approximately 1.3) of a conventional two-pole sintered ferrite magnet. Accordingly, incredibly significant reduction in size and weight can be realized in which the total volume of the motor is decreased to approximately one half while the same torque constant as that of a conventional motor is maintained. In addition, an innovative effect can be obtained, that is, a significant improvement in performance can be achieved, in which the torque constant is increased to approximately twice while the volume is decreased by only approximately 20% with respect to a motor using a conventional ferrite magnet (approximately 80% of a conventional volume). In this embodiment, the volume is evaluated based on the total volume of the motor. Since brushes and commutators are commonly present in two motors, the volume of an effective portion generating the torque can be decreased to 37% when the torque constants are set to be equal to each other.

When an anisotropic rare earth bonded magnet having a maximum energy product (BHmax) of 25 MGOe is used, in the range of $0.03 \leq d/a \leq 0.07$, the motor performance index T is 2.56 times. In addition, when an anisotropic rare earth bonded magnet having a maximum energy product (BHmax) of 20 MGOe is used, in the range of $0.03 \leq d/a \leq 0.07$, the motor performance index T is 2.46 times. Furthermore, when an anisotropic rare earth bonded magnet having a maximum energy product (BHmax) of 17 MGOe is used, in the range of $0.03 \leq d/a \leq 0.07$, the motor performance index T is 2.39 times. Hence, this range d/a is a more preferable range.

When the ratio d/a of the magnet thickness to the diameter of the electromagnetic rotator is 0.07, the motor performance index T per unit quantity of used magnet (that is, the motor performance index T/quantity of used magnet, this ratio S is hereinafter referred to as "magnet efficiency") is equal to two times the magnet performance multiple m, times, i.e., 2m, the magnet efficiency of a conventional two-pole ferrite motor. In this embodiment, the magnet performance multiple m is defined by (performance [(BH)max] of an anisotropic rare earth bonded magnet)/(performance [BH]max of a sintered ferrite magnet). For example, when the performance (maximum energy product) of the anisotropic rare earth bonded magnet is 17 MGOe, and the performance (maximum energy product) of the ferrite sintered bonded magnet is 3.5 MGOe, the magnet performance multiple m is 4.9. As is the above case, when the maximum energy product of the anisotropic rare earth bonded magnet is 20 MGOe, the magnet performance multiple m is 5.7, and when the maximum energy product of the anisotropic rare earth bonded magnet is 25 MGOe, the magnet performance multiple m is 7.1.

The ratio d/a of the magnet thickness to the diameter of the electromagnetic rotator at which the magnet efficiency S becomes two times the magnet performance multiple m times the magnet efficiency of a conventional two-pole ferrite motor is an approximately constant value of 0.07 regardless of the value of the maximum energy product of the anisotropic rare earth bonded magnet when it is 17 MGOe or more.

When the ratio d/a of the magnet thickness to the diameter of the electromagnetic rotator is 0.07 or less, the magnet efficiency S of the motor device according to the present invention becomes the value not smaller than two times the magnet performance multiple m times (i.e., 2m times) the magnetic efficiency of a conventional two-pole ferrite motor. However, when the ratio d/a of the magnet thickness to the diameter of the electromagnetic rotator is close to the lower limit of 0.015, although the magnet efficiency becomes maximum, since the thickness of the magnet is decreased, the demagnetizing field is increased. As a result, the magnetic flux penetrating the electromagnetic rotator is rapidly decreased, and the motor performance index T is decreased to approximately two times that of a motor using a conventional two-pole sintered ferrite magnet; hence, the ratio d/a of the magnet thickness to the diameter of the electromagnetic rotator is preferably set to 0.015 or more.

When the outer diameter of the motor is set to 50 mm or less, the above range of the ratio d/a of the magnet thickness to the diameter of the electromagnetic rotator indicates that the housing thickness w and the magnet thickness d are both small. When it is assumed that the outer diameter of the motor is fixed, corresponding to the decrease in the housing thickness w and to that in the magnet thickness d, the diameter of the electromagnetic rotator can be increased, and the wire diameter can be increased; hence, the output torque can be improved.

In addition, since being formed by resin molding, this anisotropic rare earth bonded magnet can be easily formed with good accuracy. Accordingly, the permanent magnet provided in the inner peripheral portion of the motor housing can be formed into a hollow-cylinder shape with good accuracy. That is, the motor inner magnetic field by the permanent magnet may have rotation symmetry having a good accuracy.

In particular, even when the motor housing and the motor device according to the present invention are used while being immersed in an organic solution or while an organic solution passes through the housing, infiltration of the organic solution into the anisotropic rare earth bonded magnet is prevented, and hence corrosion resistance and swelling resistance of the bonded magnet can be improved. As a result, the properties of the motor device can be prevented from being degraded with time.

EXAMPLES

Next, various properties of the anisotropic rare earth bonded magnet were measured. The measurement will be described below.

The viscosity properties of a phenol-novolac type epoxy resin used as the binder of the anisotropic rare earth bonded magnet and the viscosity properties of a bisphenol-A type epoxy resin which was heretofore used were measured. The results are shown in FIG. 5. Accordingly, it is understood that the minimum value of the viscosity of the phenol-novolac type epoxy resin used in the present invention is smaller than that of the bisphenol-A type epoxy resin by approximately one order of magnitude. In addition, it is found that the temperature of the phenol-novolac type epoxy resin at the minimum value is lower than that of that of the bisphenol-A type epoxy resin at the minimum value. When the orientation treatment of the magnetic powder is performed in a region in which the viscosity of the resin is lowest, the magnetic field may be decreased, and hence the efficiency is improved. As described above, since the orientation treatment of the bonded magnet according to the present invention can be efficiently performed, and the temperature suitable for the orientation treatment is low, the orientation treatment can be performed in a short period of time. Hence, the manufacturing efficiency is improved.

Next, the properties of the coating layer 18 composed of a polyamide-imide resin will be described. The density of pinholes was measured which were formed in the coating layer surface when spraying of a polyamide-imide resin solution in an oblique direction and drying by baking are repeatedly performed. The results are shown in FIG. 6. The coating thickness per one spraying was 10 μm. In addition, as the infiltration treatment, a method was employed in which after spraying was performed in a direction of 90°, a sprayed object was left under a reduced-pressure environment. Also in this case, air bubbles were released from the inside of the bonded magnet to the outside by a reduced pressure, and instead of the air bubbles, a polyamide-imide resin applied on the surface layer was infiltrated inside. By this treatment, the thickness of the coating layer to be formed was also 10 μm. When the infiltration treatment is performed, it is understood that the pinhole density is $2/cm^2$ at a coating layer thickness of 20 μm, the pinhole density is $1/cm^2$ at a coating layer thickness of 30 μm, and the pinhole density is $0/cm^2$ at a coating layer thickness of 40 μm. When the infiltration treatment is not performed, even when the thickness of the coating layer is more than 40 μm, the pinhole density cannot be decreased to $0/cm^2$. When the coating layer is formed by performing the infiltration treatment of the present invention, it is apparently understood that the pinhole density of the coating layer surface is decreased. That is, corrosion resistance and swelling resistance of the bonded magnet processed by this treatment are significantly improved.

However, it is understood that when a commercially available polyamide-imide resin (viscosity of 30 seconds by a flow cup method (JIS K5600-2-2)) was diluted with an organic solvent such as dimethylformamide (DMF) so as to decrease its viscosity to ⅓ (10 seconds in the case of the above resin) or less and was then sprayed, superior properties can be obtained without performing the infiltration treatment. The reason for this is that since the viscosity of the polyamide-imide resin solution is decreased in an initial coating step, the capillary phenomenon works effectively, and as a result, the polyamide-imide resin is infiltrated in pore portions of the anisotropic bonded magnet that uses a phenol-novolac type epoxy resin. Accordingly, to decrease the viscosity of the polyamide-imide resin and then perform spraying corresponds to the infiltration treatment of the present invention. On the other hand, when the viscosity is decreased to less than ⅙ (less than 5 seconds in the case of the above resin), and spraying is then performed, the thickness of the coating layer cannot be sufficiently obtained. Hence, the viscosity must be ⅙ or more.

In addition, after the coating layer having a thickness of 10 μm was formed by the infiltration treatment, a coating layer was formed by spraying one time to have a thickness of 20 μm or 10 μm, and the pinhole density on the topmost surface of the coating layer was measured. The results are shown in FIG. 7. In the case in which the total thickness of the coating layers is not changed, the pinhole density can be significantly decreased when the thickness of the coating layer obtained per one coating is decreased and when the number of coating times is increased. That is, when the total thickness is not changed, as the number of the coating layers is increased, the pinhole density is decreased. After the infiltration treatment, a method for forming the coating layer was performed by a method shown in FIG. 8. That is, a polyamide-imide resin was sprayed in a direction of approximately 90° to the side surface of the bonded magnet.

Next, gasoline, methanol, and ethanol were assumed as an organic solution, and the anisotropic rare earth bonded magnet was immersed in the above organic solvent; the relationship between the immersion time and the magnetic properties was measured. An organic-solvent resistance test was performed as described below. After surfaces of bonded magnets using various binder resins were processed by infiltration treatments using a common epoxy resin or a polyamide-imide or were not processed, and the coating layer was then further formed on each bonded magnet, the bonded magnets were each received in a pressure-resistant and air-tight container having an inside volume of 7 liters together with 1 liter of commercially available regular gasoline, and the lid thereof was then tightened. Subsequently, after this pressure-resistant and air-tight container was placed in a water bath and was held for a predetermined time at 80° C., the bonded magnets were recovered, and the change in dimension and the irreversible flux loss were measured.

Test pieces each having the coating layer composed of the polyamide-imide were processed by spray coating in a direction of 90° to formation surfaces and were then processed by a reduced-pressure treatment to form a thickness of 10 μm by an infiltration treatment using a reduced pressure, and in addition, a treatment of forming a thickness of 10 μm by spray coating similar to that described above was performed twice, so that a total thickness of 30 μm was formed. As a result, the coating layer was formed in which the number of pinholes viewed from the surface was decreased to 10 pinholes/$cm^2$ or less. When the polyamide-imide was used as the coating layer processed by the infiltration treatment, in both cases in which a phenol-novolac type epoxy resin and a bisphenol-A type epoxy resin were used as the binder, the number of pinholes in the surface was 8 as shown in the FIGS. 9 and 10.

Next, after a film having a thickness of 10 μm was formed by spray coating in an oblique direction (in a direction of 45°), a film having a thickness of 10 μm was further formed twice by spray coating similar to that described above, so that the coating layer was formed to have a thickness of 30 μm. In these test pieces, a phenol-novolac type epoxy resin and a bisphenol-A type epoxy resin were used as the binder resin, and a polyamide-imide was used for the coating layer. In this case, the number of pinholes observed on the surface of the coating layer was 25 pinholes/$cm^2$ as shown in the FIGS. 9 and 10.

Next, various measurement results are shown in FIG. 9. In the case (example) of the present invention in which a phenol-novolac type epoxy resin was used as the binder, the infiltration was performed using a polyamide-imide, and the coating layer was further formed, even when immersion was performed for 1,000 hours, degradation in performance was not observed. On the other hand, in the case (comparative example 1) in which although a phenol-novolac type epoxy resin was used as the binder, an epoxy resin was used for the coating layer, and in the case (comparative example 2) in which a bisphenol-A type epoxy resin was used as the binder, and a polyamide-imide resin was used for the coating layer, as the immersion time is increased, degradation in magnetic properties was observed. It is found that compared to the results according to the present invention, in comparative examples 1 and 2, by immersion for 1,000 hours, the magnetic loss (decreased amount of magnetic flux) is increased by approximately 40%. In addition, in the case (comparative example 3) in which a bisphenol-A type epoxy resin was used as the binder, and an epoxy resin was used for the coating layer, by immersion for 100 hours, it is found that the magnetic loss is increased by 60%. In this case, since the bonded magnet was destroyed on account of swell by immersion for 100 hours, the properties obtained after immersion for 1,000 hours could not be measured.

In addition, in the case (comparative example 4) in which a phenol-novolac type epoxy resin was used as the binder, and although the coating layer was formed using a polyamide-imide, a test piece was not positively processed by the infiltration treatment, it is found that by immersion for 1,000 hours, the magnetic loss (decreased amount of magnetic flux) is increased by approximately 50%. In addition, in the case (comparative example 5) in which a bisphenol-A type epoxy resin was used as the binder, and although the coating layer was formed using a polyamide-imide, a test piece was not positively processed by the infiltration treatment, it is found that by immersion for 1,000 hours, the magnetic loss (decreased amount of magnetic flux) is increased by approximately 100%, that is, the loss is increased to twice the initial value.

The rate of change in dimension of the bonded magnet with the immersion time was measured. That is, swelling properties were measured. The results are shown in FIG. 10. Even after the bonded magnet of the above example according to the present invention was immersed for 1,000 hours, the rate of change in dimension was 0. According to comparative examples 1 and 2, by immersion for 1,000 hours, the change in dimension was 0.2%; and according to comparative example 3, by immersion for 100 hours, the change in dimension was 0.4%, and by immersion for 1,000 hours, the bonded magnet was destroyed by swelling. In addition, according to comparative example 4, by immersion for 1,000 hours, the change in dimension was 0.3%, and according to comparative example 5, by immersion for 1,000 hours, the change in dimension was 0.4%. Accordingly, the superiority of the anisotropic rare earth bonded magnet according to the present invention can be understood.

Next, by using a polyamide-imide, a polyimide, a polyamide, and an epoxy resin for the coating layer, the relationship between the number of pinholes and the change in dimension after immersion in regular gasoline for 1,000 hours was measured. The results are shown in Table 1.

TABLE 1

| Material | Film Thickness (μm) | Coating Method | Pinhole Density (pinholes/ cm$^2$) | Rate of Change in Dimension after 1,000 Hours (%) |
|---|---|---|---|---|
| polyamide-imide | 33 | Coating on inner peripheral side at 90° With infiltration treatment | 8 | 0.012 |
| Polyimide | 35 | | 7 | 0.063 |
| Polyamide | 32 | | 8 | 0.078 |
| Epoxy Resin | 33 | | 7 | 0.195 |

After the infiltration treatment was performed for the magnetic surface in a manner similar to that using a polyamide-imide resin, each coating layer was formed by spraying to the side surface of the bonded magnet at an angle close to 90°. The thicknesses of the resin films thus formed were 32 to 35 μm, and the pinhole densities were all less than 10 pinholes/cm$^2$. From Table 1, in the case of the present invention in which a phenol-novolac type epoxy resin was used as the binder, the infiltration treatment was performed using a polyamide-imide, and the coating layer is further formed, the rate of change in dimension after 1,000 hours was 0.012%. In the cases in which a phenol-novolac type epoxy resin was used as the binder, the infiltration treatment was performed using a polyamide resin, a polyimide resin, and an epoxy resin, respectively, and the coating layer was further formed, the rates of change in dimension after immersion in gasoline for 1,000 hours were 0.063%, 0.078%, and 0.195%, respectively. In the cases described above, the rate of change is large as compared to that of the case in which the polyamide-imide was used for the coating layer. The bonded magnets used in the experiments all have an outer diameter of 33 mm and an inner diameter of 30 mm. In general, as for the change in dimension after immersion in gasoline for 1,000 hours, the target dimensional tolerance of the bonded magnet is 0.015 mm or less; this corresponds to 0.05% or less when the inner diameter is 30 mm, and 0.03% or less when the inner diameter is 50 mm. It is understood that the target value is satisfied in the example according to the present invention. According to the results described above, when a phenol-novolac type epoxy resin is used as the binder, a polyamide-imide is used for the coating layer, and the pinhole density is decreased to less than 10 pinholes/cm$^2$, as is the example of the present invention, it is understood that corrosion resistance and swelling resistance can be significantly improved.

Next, in the case in which the pinhole density of the coating layer was changed, the magnetic loss and the rate of changed in dimension of the bonded magnet were measured after the bonded magnet provided with the coating layer was immersed in regular gasoline for 1,000 hours. The results are shown in FIGS. 11 and 12, respectively. In addition, the viscosity of the resin solution, implementation of the infiltration treatment, the pinhole density, and the film thickness are shown in Table 2. The film thicknesses of the coating layers which were formed on the bonded magnet surfaces and which had respective pinhole densities were in the range of 31 to 35 μm. The pinhole density was changed by changing the viscosity of the resin solution and was changed with or without implementing the infiltration treatment. As a dilute solution for a polyamide-imide resin solution, DMF was used. The resin solution was sprayed from the inner peripheral side of the magnet, and the spraying angle was set to 900 to the magnet surface.

TABLE 2

| | Pinhole Density (pinholes/ cm$^2$) | Coating Method | Film Thickness (μm) |
|---|---|---|---|
| Δ | 5 | Viscosity: 10 seconds, with infiltration treatment | 31 |
| ● | 8 | Viscosity: 30 seconds, with infiltration treatment | 33 |
| ◇ | 12 | Viscosity: 20 seconds, without infiltration treatment | 32 |
| ○ | 15 | Viscosity: 25 seconds, without infiltration treatment | 35 |
| ▽ | 25 | Viscosity: 30 seconds, without infiltration treatment | 33 |

In FIG. 13, the result is shown which was obtained by plotting the rate of change in dimension after immersion for 1,000 hours, shown in FIG. 12, with the pinhole density. It is found that as the pinhole density is increased, the rate of change in dimension is increased. From this result, even when the bonded magnet is immersed in an organic solvent for 1,000 hours at 80° C., in order to obtain a value of 0.05% or less, which is the target tolerance range of the inner diameter, it is important that the pinhole density of the coating layer formed on the magnet surface be set to 10 pinholes/cm$^2$ or less.

INDUSTRIAL APPLICABILITY

The present invention may be used for a motor device which is used in an organic solvent such as gasoline. In particular, the present invention is effectively used for a fuel pump motor device for automobiles. However, since the present invention is effective when being used under the presence of organic solvents, the application of the present invention is not limited to fuel pumps.

The invention claimed is:

1. A motor housing comprising:
   a housing of a motor; and
   a permanent magnet disposed at an inner peripheral portion of said housing, said permanent magnet comprising a hollow-cylinder shaped anisotropic rare earth bonded magnet that is heated and press-fitted along said inner peripheral portion of said housing, said anisotropic rare earth bonded magnet comprising:
      an anisotropic rare earth magnet powder; and
      a phenol-novolac type epoxy resin being used as a binder and having a weight ratio to the anisotropic rare earth bonded magnet in a range of 2 to 3 percent by weight, said anisotropic rare earth magnet powder being compounded and subsequently molded with said phenol-novolac type epoxy resin
   wherein an exposed surface layer of said anisotropic rare earth bonded magnet which is press-fitted in said housing is processed by at least an infiltration treatment using a polyamide-imide-based resin to form a coating layer which has a pinhole density of 10 pinholes/cm$^2$ or less.

2. A motor housing according to claim 1, wherein said anisotropic rare earth magnet powder includes an NdFeB-based magnetic powder processed by a d-HDDR treatment.

3. A motor housing according to claim 2, wherein said anisotropic rare earth magnet powder further includes an SmFeN-based magnetic powder.

4. A motor housing according to claim 1, wherein said infiltration treatment of said surface layer is to immerse said anisotropic rare earth bonded magnet in a solution of said polyamide-imide resin under reduced-pressure conditions.

5. A motor housing according to claim 1, wherein said coating layer is formed by said infiltration treatment and subsequent spray coating of said polyamide-imide-based resin.

6. A motor housing according to claim 1, wherein said coating layer comprises a layer formed by repeating coating and firing.

7. A motor housing according to claim 1, wherein a thickness of said coating layer is in a range of 10 to 50 μm.

8. A motor device comprising: said motor housing according to claim 1.

9. A motor device according to claim 8, wherein said motor device is used in an organic solution or is used in a state in which an organic solvent passes through said housing.

10. A motor device for a fuel pump, according to claim 9, wherein said motor device is used for a fuel pump of an automobile and is used in a state in which a petroleum fuel passes through said housing.

11. A motor housing according to claim 1, wherein the coating layer is continuously formed on positions of the inner peripheral surface of the housing which are in vicinities of two end portions of the bonded magnet.

12. A motor housing according to claim 1, wherein a temperature for the press-fitting is in a range from T °C. to (T-100)° C., where a glass transition temperature is represented by T ° C.

13. A motor housing comprising:
   a housing of a motor; and
   a permanent magnet disposed at an inner peripheral portion of said housing, said permanent magnet comprising a hollow-cylinder shaped anisotropic rare earth bonded magnet that is press-fitted in a heated state along said inner peripheral portion of said housing, said anisotropic rare earth bonded magnet comprising:
      an anisotropic rare earth magnet powder; and
      a phenol-novolac type epoxy resin, said anisotropic rare earth magnet powder being compounded and subsequently molded with said phenol-novolac type epoxy resin
   wherein an exposed surface layer of said anisotropic rare earth bonded magnet which is press-fitted in said housing is processed by at least an infiltration treatment using a polyamide-imide-based resin to form a coating layer, and
   wherein said infiltration treatment of said surface layer is to immerse said anisotropic rare earth bonded magnet in a solution of said polyamide-imide resin under reduced-pressure conditions.

14. A motor housing according to claim 13, wherein, before said anisotropic rare earth bonded magnet is immersed in said solution of said polyamide-imide-based resin under said reduced pressure conditions, said anisotropic rare earth bonded magnet is placed under a reduced-pressure environment to be evacuated, followed by supply of said solution under said reduced-pressure environment, whereby said anisotropic rare earth bonded magnet is immersed in said solution.

15. A motor housing according to claim 13, wherein a pinhole density at a surface of said coating layer is 10 pinholes/cm$^2$ or less.

16. A motor device comprising: said motor housing according to claim 13.

17. A motor device according to claim 16, wherein said motor device is used in an organic solution or is used in a state in which an organic solvent passes through said housing.

18. A motor device for a fuel pump, according to claim 17, wherein said motor device is used for a fuel pump of an automobile and is used in a state in which a petroleum fuel passes through said housing.

19. A motor housing, comprising:
   a housing of a motor; and
   a permanent magnet disposed at an inner peripheral portion of said housing, said permanent magnet comprising a hollow-cylinder shaped anisotropic rare earth bonded magnet that is press-fitted in a heated state along said inner peripheral portion of said housing, said anisotropic rare earth bonded magnet comprising:
      an anisotropic rare earth magnet powder; and
      a phenol-novolac type epoxy resin, said anisotropic rare earth magnet powder being compounded and subsequently molded with said phenol-novolac type epoxy resin,
   wherein an exposed surface layer of said anisotropic rare earth bonded magnet which is press-fitted in said housing is processed by at least an infiltration treatment using a polyamide-imide-based resin to form a coating layer, and
   wherein said infiltration treatment of said surface layer is performed by spraying a solution of said polyamide-imide-based resin, followed by placing said anisotropic rare earth bonded magnet under a reduced pressure environment.

20. A motor housing according to claim 19, wherein a pinhole density at a surface of said coating layer is 10 pinholes/cm$^2$ or less.

21. A motor device comprising: said motor housing according to claim 19.

22. A motor device according to claim 21, wherein said motor device is used in an organic solution or is used in a state in which an organic solvent passes through said housing.

23. A motor housing, comprising:
a housing of a motor; and
a permanent magnet disposed at an inner peripheral portion of said housing, said permanent magnet comprising a hollow-cylinder shaped anisotropic rare earth bonded magnet that is press-fitted in a heated state along said inner peripheral portion of said housing, said anisotropic rare earth bonded magnet comprising:
an anisotropic rare earth magnet powder; and
a phenol-novolac type epoxy resin, said anisotropic rare earth magnet powder being compounded and subsequently molded with said phenol-novolac type epoxy resin,
wherein an exposed surface layer of said anisotropic rare earth bonded magnet which is press-fitted in said housing is processed by at least an infiltration treatment using a polyamide-imide-based resin to form a coating layer, and
wherein said infiltration treatment of said surface layer is performed using a capillary phenomenon by spraying a low-viscosity solution of said polyamide-imide-based resin.

24. A motor housing according to claim 23, wherein a pinhole density at a surface of said coating layer is 10 pinholes/cm$^2$ or less.

25. A motor device comprising: said motor housing according to claim 23.

26. A motor device according to claim 25, wherein said motor device is used in an organic solution or is used in a state in which an organic solvent passes through said housing.

* * * * *

UNITED STATES PATENT AND TRADEMARK OFFICE
CERTIFICATE OF CORRECTION

| | | |
|---|---|---|
| PATENT NO. | : 7,812,484 B2 | Page 1 of 1 |
| APPLICATION NO. | : 11/791727 | |
| DATED | : October 12, 2010 | |
| INVENTOR(S) | : Yoshinobu Honkura et al. | |

It is certified that error appears in the above-identified patent and that said Letters Patent is hereby corrected as shown below:

In the Claims:

Claim 12, at column 21, lines 60-62, change "from T ° C. to (T-100)° C., where a glass transition temperature is represented by T ° C." to --from T°C to (T-100) °C, where a glass transition temperature is represented by T°C.--; and Claim 13, Column 22, line 8 change "resin" to --resin,--.

Signed and Sealed this
Eighteenth Day of January, 2011

David J. Kappos
*Director of the United States Patent and Trademark Office*